(12) United States Patent
Safian et al.

(10) Patent No.: US 11,409,038 B1
(45) Date of Patent: Aug. 9, 2022

(54) POLARIZATION ROTATOR-SPLITTERS INCLUDING OXIDE CLADDINGS

(71) Applicant: IMEC USA NANOELECTRONICS DESIGN CENTER, Inc., Kissimmee, FL (US)

(72) Inventors: Reza Safian, Orlando, FL (US); Tianren Fan, Atlanta, GA (US)

(73) Assignee: IMEC USA NANOELECTRONICS DESIGN CENTER, Inc., Kissimmee, FL (US)

( * ) Notice: Subject to any disclaimer, the term of this patent is extended or adjusted under 35 U.S.C. 154(b) by 0 days.

(21) Appl. No.: 17/186,686

(22) Filed: Feb. 26, 2021

(51) Int. Cl.
*G02B 6/126* (2006.01)
*G02B 6/12* (2006.01)

(52) U.S. Cl.
CPC .......... *G02B 6/126* (2013.01); *G02B 6/12016* (2013.01); *G02B 2006/1209* (2013.01)

(58) Field of Classification Search
None
See application file for complete search history.

(56) References Cited

U.S. PATENT DOCUMENTS

| | | | |
|---|---|---|---|
| 2015/0338577 A1 | 11/2015 | Shi et al. | |
| 2017/0052315 A1 | 2/2017 | Barwicz et al. | |
| 2018/0149811 A1* | 5/2018 | Park | G02B 6/125 |
| 2018/0231713 A1 | 8/2018 | Picard | |
| 2019/0025506 A1* | 1/2019 | Park | G02B 6/1228 |
| 2020/0003953 A1* | 1/2020 | Park | G02B 6/2766 |

OTHER PUBLICATIONS

Dai, Daoxin, Yongbo Tang, and John E. Bowers. "Mode conversion in tapered submicron silicon ridge optical waveguides." Optics express 20, No. 12 (2012): 13425-13439.
Dai, Daoxin, and John E. Bowers. "Novel concept for ultracompact polarization splitter-rotator based on silicon nanowires." Optics express 19, No. 11 (2011): 10940-10949.

(Continued)

*Primary Examiner* — Jerry Rahll
(74) *Attorney, Agent, or Firm* — McDonnell Boehnen Hulbert & Berghoff LLP

(57) ABSTRACT

The present disclosure relates to polarization rotator-splitters that include oxide claddings. One example embodiment includes a device. The device includes a first waveguide. The first waveguide includes a first end configured to receive electromagnetic waves having a first polarization with a first mode-order and electromagnetic waves having a second polarization. The first waveguide also includes a mode-conversion section configured to convert electromagnetic waves having the second polarization into electromagnetic waves having the first polarization with a second mode-order. Additionally, the device includes a second waveguide. The second waveguide also includes a coupling section configured such that electromagnetic waves having the first polarization with the second mode-order are converted into electromagnetic waves having the first polarization with the first mode-order and coupled from the coupling section of the first waveguide into the coupling section of the second waveguide.

20 Claims, 10 Drawing Sheets

(56) References Cited

OTHER PUBLICATIONS

Chang, Weijie, Shengyao Xu, Mengfan Cheng, Deming Liu, and Minming Zhang. "Inverse design of a single-step-etched ultracompact silicon polarization rotator." Optics Express 28, No. 19 (2020): 28343-28351.

Xiong, Yule, J. Gonzalo Wangüemert-Pérez, Dan-Xia Xu, Jens H. Schmid, Pavel Cheben, and N. Ye Winnie. "Polarization splitter and rotator with subwavelength grating for enhanced fabrication tolerance." Optics letters 39, No. 24 (2014): 6931-6934.

Ding, Yunhong, Haiyan Ou, and Christophe Peucheret. "Wideband polarization splitter and rotator with large fabrication tolerance and simple fabrication process." Optics letters 38, No. 8 (2013): 1227-1229.

Zhang, Yong, Yu He, Xinhong Jiang, Boyu Liu, Ciyuan Qiu, Yikai Su, and Richard A. Soref. "Ultra-compact and highly efficient silicon polarization splitter and rotator." Apl Photonics 1, No. 9 (2016): 091304.

Elbers, J-P., N. Eiselt, A. Dochhan, D. Rafique, and H. Grieer. "PAM4 vs coherent for DCI applications." In Signal Processing in Photonic Communications, pp. SpTh2D-1. Optical Society of America, 2017.

Doerr, C., Long Chen, Diedrik Vermeulen, Torben Nielsen, Saeid Azemati, Scott Stulz, Greg McBrien et al. "Singlechip silicon photonics 100-GB/s coherent transceiver." In Optical Fiber Communication Conference, pp. Th5C-1. Optical Society of America, 2014.

Tan, Kang, Ying Huang, Guo-Qiang Lo, Changyuan Yu, and Chengkuo Lee. "Ultra-broadband fabrication-tolerant polarization splitter and rotator." In Optical Fiber Communication Conference, pp. Th1G-7. Optical Society of America, 2017.

Tan, Kang, Ying Huang, Guo-Qiang Lo, Changyuan Yu, and Chengkuo Lee. "Experimental realization of an O-band compact polarization splitter and rotator." Optics express 25, No. 4 (2017): 3234-3241.

Wu, Weike, Tianhua Lin, Tao Chu, and Hua Zhang. "CMOS-compatible high efficiency polarization splitting grating coupler near 1310nm." In Asia Communications and Photonics Conference, pp. AS2F-4. Optical Society of America, 2016.

Wang, Jing, Minghao Qi, Yi Xuan, Haiyang Huang, You Li, Ming Li, Xin Chen et al. "Proposal for fabrication-tolerant SOI polarization splitter-rotator based on cascaded MMI couplers and an assisted bi-level taper." Optics express 22, No. 23 (2014): 27869-27879.

Sacher, Wesley D., Tymon Barwicz, Benjamin JF Taylor, and Joyce KS Poon. "Polarization rotator-splitters in standard active silicon photonics platforms." Optics express 22, No. 4 (2014): 3777-3786.

Sacher, Wesley D., Ying Huang, Liang Ding, Tymon Barwicz, Jared C. Mikkelsen, Benjamin JF Taylor, Guo-Qiang Lo, and Joyce KS Poon. "Polarization rotator-splitters and controllers in a Si 3 N 4-on-SOI integrated photonics platform." Optics express 22, No. 9 (2014): 11167-11174.

Guan, Hang, Ari Novack, Matthew Streshinsky, Ruizhi Shi, Yang Liu, Qing Fang, Andy Eu-Jin Lim, Guo-Qiang Lo, Tom Baehr-Jones, and Michael Hochberg. "High-efficiency low-crosstalk 1310-nm polarization splitter and rotator." IEEE Photonics Technology Letters 26, No. 9 (2014): 925-928.

Wang, Jian, Di Liang, Yongbo Tang, Daoxin Dai, and John E. Bowers. "Realization of an ultra-short silicon polarization beam splitter with an asymmetrical bent directional coupler." Optics Letters 38, No. 1 (2013): 4-6.

* cited by examiner

POLARIZATION ROTATOR-SPLITTERS INCLUDING OXIDE CLADDINGS

BACKGROUND

Unless otherwise indicated herein, the materials described in this section are not prior art to the claims in this application and are not admitted to be prior art by inclusion in this section.

Optical communication is widely used to transfer data from one entity to another in a high-bandwidth fashion. By transmitting and receiving modulated light signals (e.g., using coherent optical transceivers), a substantial amount of data (e.g., 400 Gbps) can be communicated simultaneously within a communication channel. Such communications may be used in the delivery of fiber optic internet or in optical interconnects within computing devices, for example.

In order to further enhance optical communication techniques (e.g., further enhance communication bandwidth), multiple signals can be multiplexed into a single communication channel (e.g., a single optical fiber). Further, in order to multiplex multiple signals onto a single communication channel, the multiplexed signals may have different polarizations or wavelengths. In this way, the signals can be demultiplexed on a receive side of the communication channel.

SUMMARY

The specification and drawings disclose embodiments that polarization rotator-splitters that include oxide claddings.

In a first aspect, the disclosure describes a device. The device includes a first oxide layer. The device also includes a first waveguide on the first oxide layer. The first waveguide includes a first end configured to receive electromagnetic waves having a first polarization with a first mode-order and electromagnetic waves having a second polarization. The first waveguide also includes a mode-conversion section configured to convert electromagnetic waves having the second polarization into electromagnetic waves having the first polarization with a second mode-order. In addition, the first waveguide includes a coupling section. Further, the first waveguide includes a second end configured to emit electromagnetic waves having the first polarization with the first mode-order. Additionally, the device includes a second waveguide on the first oxide layer. The second waveguide includes a first end. The second waveguide also includes a coupling section positioned adjacent to the coupling section of the first waveguide and configured such that electromagnetic waves having the first polarization with the second mode-order are converted into electromagnetic waves having the first polarization with the first mode-order and coupled from the coupling section of the first waveguide into the coupling section of the second waveguide. Further, the second waveguide includes a second end configured to emit electromagnetic waves having the first polarization with the first mode-order. Further, the device includes a second oxide layer disposed so as to encapsulate at least a portion of the first waveguide and at least a portion of the second waveguide between the first oxide layer and the second oxide layer.

In a second aspect, the disclosure describes a method. The method includes receiving, at a first end of a first waveguide, electromagnetic waves having a first polarization with a first mode-order and electromagnetic waves having a second polarization. The first waveguide is on a first oxide layer. The method also includes converting, in a mode-conversion section of the first waveguide, electromagnetic waves having the second polarization into electromagnetic waves having the first polarization with a second mode-order. In addition, the method includes coupling electromagnetic waves having the first polarization with the second mode-order from a coupling section of the first waveguide into an adjacent coupling section of a second waveguide as electromagnetic waves having the first polarization with the first mode-order. The second waveguide is on the first oxide layer. At least a portion of the first waveguide and at least a portion of the second waveguide are encapsulated between the first oxide layer and a second oxide layer. Additionally, the method includes emitting, from a second end of the first waveguide and a second end of the second waveguide, electromagnetic waves having the first polarization with the first mode-order.

In a third aspect, the disclosure describes a method of manufacture. The method of manufacture includes providing a substrate. The substrate includes a handle layer, a first oxide layer, and a device layer on the first oxide layer. The method of manufacture also includes selectively etching at least a portion of the device layer to define a first waveguide and a second waveguide. The first waveguide includes a first end configured to receive electromagnetic waves having a first polarization with a first mode-order and electromagnetic waves having a second polarization. The first waveguide also includes a mode-conversion section configured to convert electromagnetic waves having the second polarization into electromagnetic waves having the first polarization with a second mode-order. In addition, the first waveguide includes a coupling section. Further, the first waveguide includes a second end configured to emit electromagnetic waves having the first polarization with the first mode-order. The second waveguide includes a first end. The second waveguide also includes a coupling section positioned adjacent to the coupling section of the first waveguide and configured such that electromagnetic waves having the first polarization with the second mode-order are converted into electromagnetic waves having the first polarization with the first mode-order and coupled from the coupling section of the first waveguide into the coupling section of the second waveguide. Further, the second waveguide includes a second end configured to emit electromagnetic waves having the first polarization with the first mode-order. In addition, the method of manufacture includes providing a second oxide layer on at least a portion of the first waveguide and at least a portion of the second waveguide such that at least a portion of the first waveguide and at least a portion of the second waveguide are encapsulated between the first oxide layer and the second oxide layer.

In a fourth aspect, the disclosure describes a device. The device includes a first oxide layer. The device also includes a first waveguide on the first oxide layer. The first waveguide includes a means-for receiving electromagnetic waves having a first polarization with a first mode-order and electromagnetic waves having a second polarization. The first waveguide also includes a means-for converting electromagnetic waves having the second polarization into electromagnetic waves having the first polarization with a second mode-order. In addition, the first waveguide includes a means-for coupling. Further, the first waveguide includes a means-for emitting electromagnetic waves having the first polarization with the first mode-order. In addition, the device includes a second waveguide on the first oxide layer. The second waveguide includes a means-for coupling. The means-for coupling of the second waveguide is (i) positioned adjacent to the means-for coupling of the first waveguide and (ii) configured such that electromagnetic waves having the first polarization with the second mode-order are converted into electromagnetic waves having the first polarization with the first mode-order and coupled from means-for coupling of the first waveguide into the means-for coupling section of the second waveguide. In addition, the second waveguide includes a means-for emitting electromagnetic waves having the first polarization with the first mode-order. Further, the device includes a second oxide layer disposed so as to encapsulate at least a portion of the first waveguide and at least a portion of the second waveguide between the first oxide layer and the second oxide layer.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1A:
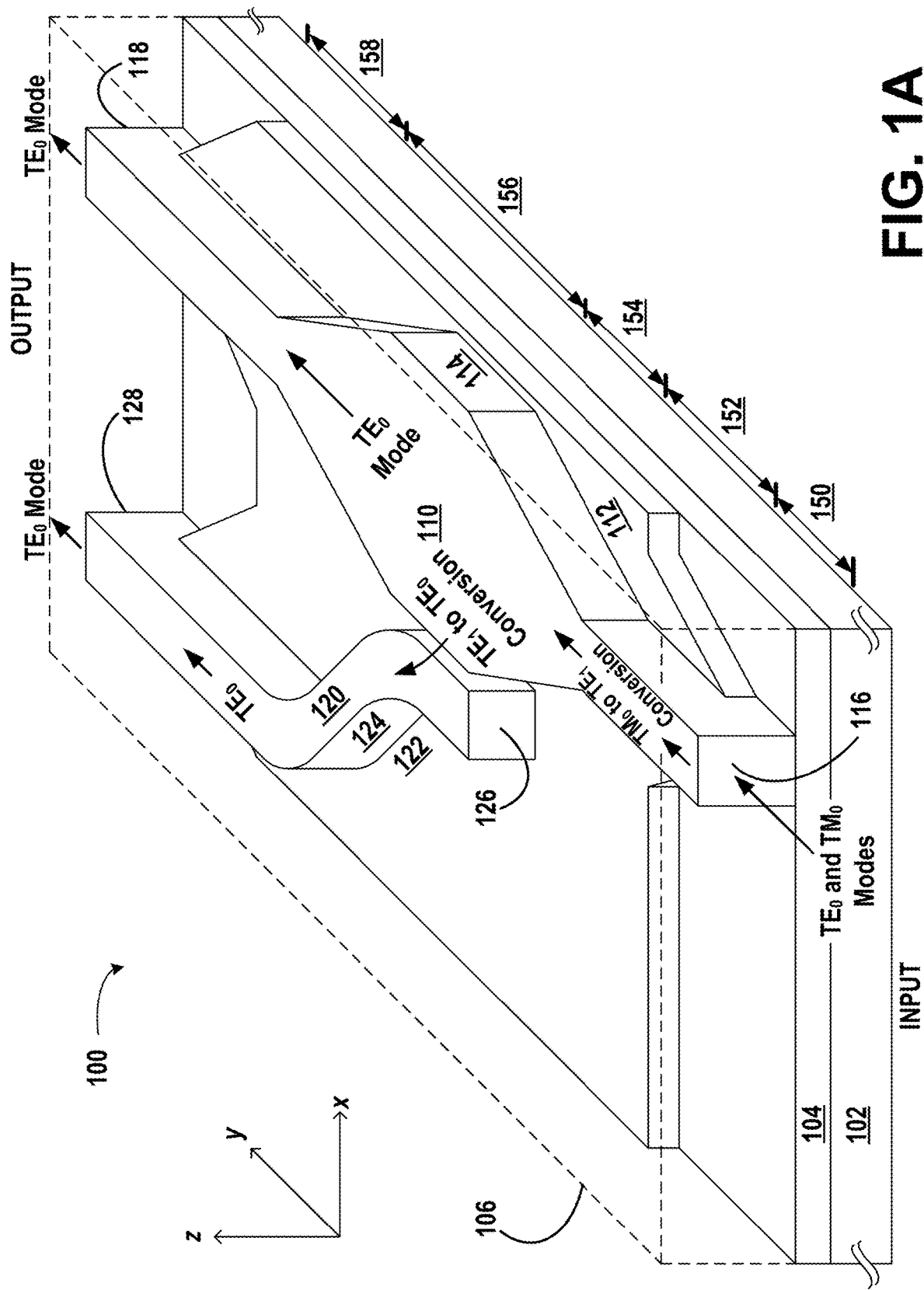
FIG. 1A is an isometric illustration of a polarization rotator-splitter, according to example embodiments.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. In addition, some of the illustrated elements may be combined or omitted. Similarly, an example embodiment may include elements that are not illustrated in the figures.

It is understood that where the terms "optical" or "visible" are used herein to describe electromagnetic waves or lights signals, other wavelengths could also be used and are contemplated herein. For example, similar techniques and devices to those described herein could be used for radio waves, infrared waves, etc. with appropriate adjustments where necessary (e.g., changes in waveguide size to accommodate electromagnetic waves having different wavelengths).

Likewise, the devices described herein convert from transverse-magnetic (TM) polarizations to transverse-electric (TE) polarizations on a receive side of a communication and from TE polarizations to TM polarizations on a transmit side of a communication. TM polarizations may correspond to electromagnetic waves having magnetic fields (e.g., $\vec{H}$) that are perpendicular (i.e., normal) to an axial direction of the waveguide. Similarly, TE polarizations may correspond to electromagnetic waves having electric fields (e.g., $\vec{E}$) that are perpendicular (i.e., normal) to an axial direction of the waveguide. It is understood that the conversions described herein are only provided as examples and that other embodiments are also possible and contemplated herein (e.g., embodiments that convert from TE polarizations to TM polarizations on a receive side of a communication and from TM polarizations to TE polarizations on a transmit side of the communication). Even further, while examples of converting from a $1^{st}$ mode-order to a fundamental mode-order (e.g., 0 mode-order) are given herein, it is understood that other conversions are also possible and contemplated herein (e.g., from a $2^{nd}$ mode-order to a $1^{st}$ mode-order, from a $3^{rd}$ mode-order to a $2^{nd}$ mode-order, from a $3^{rd}$ mode-order to a $1^{st}$ mode-order, from a $2^{nd}$ mode-order to a 0 mode-order, from a $3^{rd}$ mode-order to a 0 mode-order, from a 0 mode-order to a $1^{st}$ mode-order, from a $1^{st}$ mode-order to a $2^{nd}$ mode-order, from a $2^{nd}$ mode-order to a $3^{rd}$ mode-order, from a 0 mode-order to a $2^{nd}$ mode-order, from a $1^{st}$ mode-order to a $3^{rd}$ mode-order, from a 0 mode-order to a $3^{rd}$ mode-order, etc.).

As used herein, the term "ridge waveguide" represents a waveguide with a rectangular (or other shaped) prism structure configured to guide light (e.g., a Si rectangular prism structure) position above, below, and/or between one or more confinement structures configured to confine the guided light to the rectangular prism structure (e.g., one or more $SiO_2$ structures).

Further, as used herein, the term "rib waveguide" represents a waveguide that includes a first rectangular (or other shaped) prism structure (e.g., a Si rectangular prism structure) of one width (a "ridge structure") positioned above or below a second rectangular (or other shaped) prism structure (e.g., a Si rectangular prism structure) of a different width (a "pedestal structure"). The combination of the first rectangular prism structure and the second rectangular prism structure guide light. In addition, the "rib waveguide" includes one or more confinement structures (e.g., one or more $SiO_2$ structures) above, below, or between which the ridge structure and the pedestal structure are located. The one or more confinement structures are configured to confine the guided light to the first and second rectangular prism structures.

I. OVERVIEW

Example embodiments relate to polarization rotator-splitters that include oxide claddings. The polarization rotator-splitters described herein may be capable of separating (i.e., splitting) light signals (i.e., electromagnetic waves) with different polarizations and/or modifying (e.g., rotating) the polarization of one or more lights signals given as an input to the polarization rotator-splitter. Such polarization rotator-splitters may be attached to a coherent optical transceiver, for example. In this way, a polarization rotator-splitter as described herein could demultiplex light signals on a receive side of an optical communication channel (e.g., within a computing device) and/or multiplex light signals on a transmit side of an optical communication channel (e.g., within a computing device).

For example, multiple optical signals may be transmitted through an optical communication channel (e.g., an optical fiber) from a transmitter (e.g., a coherent optical transceiver). The optical signals may have different polarizations. For instance, a first optical signal may have a first polarization (e.g., a TE polarization) and a first mode-order (e.g., fundamental mode order). In other words, the first optical signal may be a $TE_0$ electromagnetic wave. Similarly, a second optical signal may have a second polarization (e.g., a TM polarization) and a second mode-order (e.g., a fundamental mode). In other words, the second optical signal may be a $TM_0$ electromagnetic wave. These optical signals may be received at an opposite end of the communication channel by a receiver (e.g., a coherent optical transceiver). Further, the first optical signal and the second optical signal may be communicating different streams of data.

Before processing the signals received by the receiver, though, the signals must be separated (i.e., split) from one another (e.g., to demultiplex the signals). Further, in some cases one or more detectors of the receiver (e.g., light detectors such as photodiodes) may only be capable of detecting signals with a given polarization or mode-order (e.g., due to an optical filter over the detector). For example, a detector may only be capable of detecting electromagnetic waves (e.g., converting light signals to electrical signals that can be transmitted to a processor over a wire) that are in the $TE_0$ mode. Hence, in addition to separating the signals from one another, polarization rotator-splitters described herein may modify the polarization (e.g., rotate and/or change the mode-order of) one or more of the signals (e.g., to allow the signal(s) to be detected by the detectors).

Using the example described above with the $TE_0$ and $TM_0$ electromagnetic waves multiplexed in the same communication channel, a polarization rotator-splitter as described herein may receive the first optical signal and a second optical signal (e.g., from a coherent optical transceiver) at an input end of a first waveguide of the polarization rotator-splitter. The optical signals may then be transmitted along the first waveguide to a mode-conversion section of the first waveguide. The mode-conversion section may convert the electromagnetic waves having $TM_0$ modes into electromagnetic waves having $TE_1$ modes (i.e., may change the polarization and the mode-order). Thereafter, the $TE_0$ and $TE_1$ electromagnetic waves may be transmitted to a coupling portion of the first waveguide. The coupling portion of the first waveguide may selectively convert the $TE_1$ electromagnetic waves into $TE_0$ electromagnetic waves and at the same time couple those electromagnetic waves into a coupling portion of a second waveguide that is adjacent to the coupling portion of the first waveguide. The original $TE_0$ electromagnetic waves (i.e., the $TE_0$ electromagnetic waves initially received at the input end of the first waveguide), however, may remain in the first waveguide.

Next, the $TE_0$ electromagnetic waves in the first waveguide may be transmitted to an output end of the first waveguide (e.g., and emitted from the output end of the first waveguide). Similarly, the $TE_0$ electromagnetic waves in the second waveguide may be transmitted from the coupling section of the second waveguide to an output end of the second waveguide (e.g., and emitted from the output end of the second waveguide).

Using such a polarization rotator-splitter, an input that includes two signals with different polarizations and mode-orders (e.g., $TE_0$ and $TM_0$) can be demultiplexed into different waveguides (e.g., a first signal into a first waveguide and a second signal into a second waveguide). Further, the polarization and mode-order of one of the signals can be rotated/converted to a different polarization (e.g., from $TM_0$ to $TE_0$). Such a conversion may allow a detector associated with the polarization rotator-splitter to detect that signal.

In some embodiments, the polarization rotator-splitter described above may be designed (e.g., dimensions and/or materials of the polarization rotator-splitters may be chosen) such that the polarization rotator-splitter is configured to receive electromagnetic waves having wavelengths between 1500 nm and 1600 nm. In such embodiments, the crosstalk between the output end of the first waveguide and the output end of the second waveguide may be less than −10 dB. In other words, the intensity of input $TM_0$ electromagnetic waves that is emitted from the output end of the first waveguide may be at least 10 dB lower than the intensity of input $TE_0$ electromagnetic waves that is emitted from the output end of the first waveguide. Additionally, in such embodiments, the converting loss arising from converting the $TM_0$ electromagnetic waves to $TE_0$ electromagnetic waves may be less than 0.5 dB. In other words, the intensity of $TE_0$ electromagnetic waves emitted from the output end of the second waveguide that correspond to input $TM_0$ electromagnetic waves received at an input end of the first waveguide may be lower than the intensity of input $TM_0$ electromagnetic waves by, at most, 0.5 dB.

It is understood that, while the device used to perform such a polarization rotation and polarization split can be used on the receive side as described above, the device could equally be used on a transmit side (i.e., the device is bi-directional). This may allow, for example, a transmitter to multiplex two signals that have the same initial polarization and mode-order onto a single communication channel in such a way that the two signals can be demultiplexed at a receive end of the channel. For example, a first electromagnetic signal with a $TE_0$ mode may be provided at the output end of the first waveguide and a second electromagnetic signal with a $TE_0$ mode may be provided at an output end of the second waveguide. The first and second electromagnetic signals may propagate in the reverse orders as described above, and the device may emit, from an input end of the first waveguide, the first electromagnetic signal with the $TE_0$ mode and the second electromagnetic signal with the $TM_0$ mode.

The polarization rotator-splitter described above and throughout this disclosure may be fabricated from a silicon on insulator (SOI) wafer. In such examples, an SOI wafer may include a silicon "handle" layer, a buried oxide layer (BOX), and a high-quality silicon layer or "device layer." For example the first and second waveguides may be defined within the silicon layer (i.e., a device layer) of the SOI wafer. Hence, the first and second waveguides may be positioned on (e.g., above) the buried oxide layer (i.e., a first oxide layer) of the SOI wafer. The first oxide layer may include $SiO_2$ or another insulator. It is understood that where the term "SOI" is used throughout the description, other semiconductor-insulator-semiconductor structures are also possible and contemplated herein.

Defining the first and second waveguides may include performing one or more selective etches of the device layer (e.g., using one or more photolithography steps). Further, in some embodiments, a second oxide layer (e.g., a second $SiO_2$ layer) may be deposited or grown over portions (or the entirety) of the first waveguide and portions of (or the entirety) of the second waveguide. As such, in some embodiments, the first waveguide and the second waveguide may be encapsulated between the first oxide layer and the second oxide layer (i.e., the first oxide layer and the second oxide layer form claddings for the first waveguide and the second waveguide). Based on the refractive index mismatch between the device layer (e.g., made of silicon) and the oxide layers (e.g., made of $SiO_2$), the first waveguide and the second waveguide may be able to effectively guide signals along the first waveguide and the second waveguide via total internal reflection. Further, in some embodiments, portions (or the entirety) of the first waveguide and/or portions (or the entirety) of the second waveguide may include one or more rib waveguide regions that include both ridges and pedestals. Such rib waveguide ridges may have tapers in width (e.g., a taper of a width of the ridge and/or a taper of a width of the pedestal) or in thickness. Such tapers may be permit conversion from one polarization to another and/or from one mode-order to another, in various embodiments.

II. EXAMPLE SYSTEMS

The following description and accompanying drawings will elucidate features of various example embodiments. The embodiments provided are by way of example, and are not intended to be limiting. As such, the dimensions of the drawings are not necessarily to scale.

FIG. 1A is an isometric illustration of a device 100, according to example embodiments. The device 100 may be a polarization rotator-splitter, for example. The device 100 may include a handle layer 102, a first oxide layer 104 on the handle layer 102, a second oxide layer 106, a first waveguide 110, and a second waveguide 120. The second oxide layer 106 may cover portions of the handle layer 102, the first oxide layer 104, the first waveguide 110, and/or the second waveguide 120 in various regions of the device 100 and/or in various embodiments. The second oxide layer 106 has is illustrated using dashed lines and has been made transparent in FIG. 1A for to make the other components of the device 100 visible in the drawing. As illustrated, at least a portion of the first waveguide 110 and at least a portion of the second waveguide 120 may be encapsulated between the first oxide layer 104 and the second oxide layer 106. The first waveguide 110 may include a first end 116 (e.g., an input end) and a second end 118 (e.g., an output end). Similarly, the second waveguide 120 may include a first end 126 (e.g., an input end) and a second end 128 (e.g., an output end). The first end 116 of the first waveguide 110 may be electromagnetically coupled to a coherent optical transceiver (e.g., to receive input electromagnetic signals at the first end 116 of the first waveguide 110), in some embodiments. It is understood that additional or alternative parts of the device 100 may be electromagnetically coupled to a coherent optical transceiver. In addition, at least a portion of the first waveguide 110 may include a rib waveguide. The rib waveguide of the first waveguide 110 may include a pedestal 112 and a ridge 114. Likewise, at least a portion of the second waveguide 120 may include a rib waveguide. The rib waveguide of the second waveguide 120 may include a pedestal 122 and a ridge 124.

In some embodiments, the device 100 (e.g., the first end 116 of the first waveguide 110) may be configured to receive electromagnetic waves having wavelengths between 1530 nm and 1565 nm (e.g., the conventional band (C-band) used in fiber optic communications). In alternate embodiments, the device 100 (e.g., the first end 116 of the first waveguide 110) may be configured to receive electromagnetic waves having wavelengths between 1260 nm and 1360 nm (e.g., the original band (O-band) used in fiber optic communications). The dimensions and/or shapes (e.g., angles of tapers) of one or more of the structures in the device 100 may be chosen based on the wavelength range for which the device 100 is designed. Other wavelength ranges (e.g., between 1500 nm and 1600 nm), including non-optical wavelength ranges, are also possible and are contemplated herein (e.g., with appropriate modifications to dimensions and/or materials as may be required).

The device 100 may include a mode-conversion section 150 (e.g., a mode-conversion section of the first waveguide 110), an adiabatic tapered rib section 152 (e.g., an adiabatic tapered rib section of the first waveguide 110), coupling sections 154 (e.g., a coupling section of the first waveguide 110 and a coupling section of the second waveguide 120), a reverse adiabatic tapered rib section/s-shaped section 156 (e.g., a reverse adiabatic tapered rib section of the first waveguide 110 and an s-shaped section of the second waveguide 120), and reverse tapered rib sections 158 (e.g., a reverse tapered rib section of the first waveguide 110 and a reverse tapered rib section of the second waveguide 120). In other words, the first waveguide 110, for example, may include a mode-conversion section 150, an adiabatic tapered rib section 152, a coupling section 154, a reverse adiabatic tapered rib section 156, and a reverse tapered rib section 158. Additionally, the second waveguide 120 may include a coupling section 154, an s-shaped section 156, and a reverse tapered rib section 158.

The device 100 illustrated in FIG. 1A may have been fabricated using a series of fabrications steps (e.g., as shown and described with reference to FIG. 3A-6C). For example, the device 100 may be fabricated from a SOI wafer that includes a handle layer 102 (e.g., a bulk silicon layer). The SOI wafer may also include a first oxide layer 104 (e.g., a SiO$_2$ oxide layer) and a silicon device layer from which the first waveguide 110 and the second waveguide 120 are selectively etched (e.g., using a two-step etch process). Thereafter, the second oxide layer 106 may be deposited on or grown on the first waveguide 110 and the second waveguide 120 to encapsulate the first waveguide 110 and the second waveguide 120 between the first oxide layer 104 and the second oxide layer 106. As such, the resulting handle layer 102, the first waveguide 110, and the second waveguide 120 may each be made of Si. Further, the first oxide layer 104 and the second oxide layer 106 may each be made of SiO$_2$. It is understood, though, that in other embodiments other materials may be used. For example, the handle layer 102, the first waveguide 110, and/or the second waveguide 120 may be made of SiN, Ge, etc. In some embodiments, the first waveguide 110 and the second waveguide 120 may be fabricated from the same material as one another. However, in alternate embodiments, the first waveguide 110 and the second waveguide 120 may include one or more different materials from one another.

Further, each of the layers of the device (e.g., the handle layer 102, the first oxide layer 104, the second oxide layer 106, etc.) may have different thicknesses (e.g., z-dimensions, as illustrated in FIG. 1A) from one another. For example, the handle layer may have a thickness between 710 µm and 740 µm (e.g., 725 µm). In addition, the first oxide layer 104 may have a thickness of between 1.9 µm and 2.1 µm (e.g., 2.0 µm). Similarly, the second oxide layer 106 may have a thickness of between 1.9 µm and 2.1 µm (e.g., 2.0 µm) in the portions of the second oxide layer 106 that overlay the first waveguide 110 and the second waveguide 120. Further, the thickness of the device layer may be between 200 nm and 240 nm (e.g., 220 nm). The device layer may include both the first waveguide 110 (e.g., both the pedestal 112 and the ridge 114) and the second waveguide 120 (e.g., both the pedestal 122 and the ridge 124), for example. In some embodiments, for example, the pedestals 112/122 may have thicknesses between 60 nm and 80 nm (e.g., 70 nm) and the ridges 114/124 may have thicknesses between 140 nm and 160 nm (e.g., 150 nm). In alternate embodiments, the pedestals 112/122 may have thicknesses between 140 nm and 160 nm (e.g., 150 nm) and the ridges 114/124 may have thicknesses between 60 nm and 80 nm (e.g., 70 nm). It is understood that these dimensions are solely provided as examples and that other dimensions are also possible and are contemplated herein.

Figure 1B:
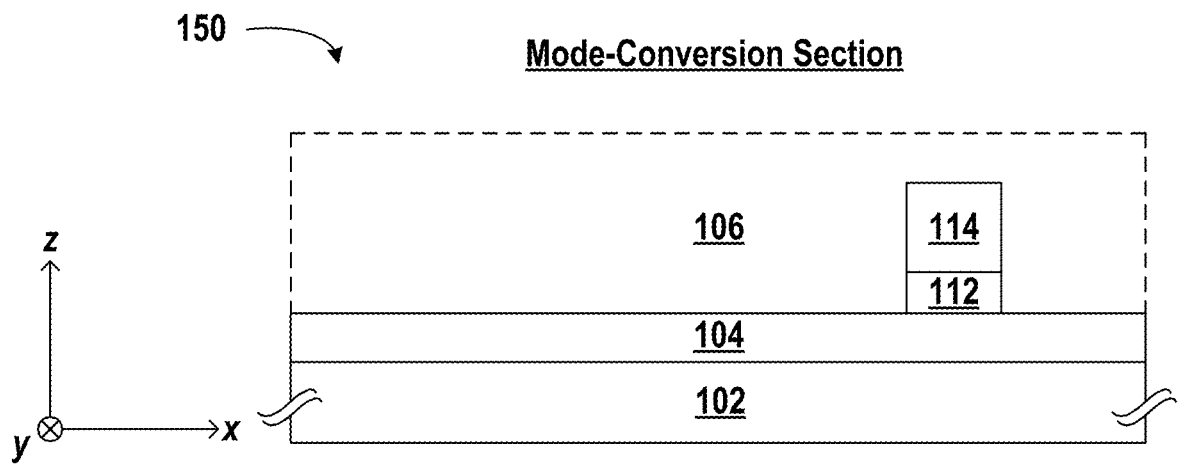
FIG. 1B is a cross-sectional illustration of a portion of a polarization rotator-splitter, according to example embodiments.
Figure 1C:
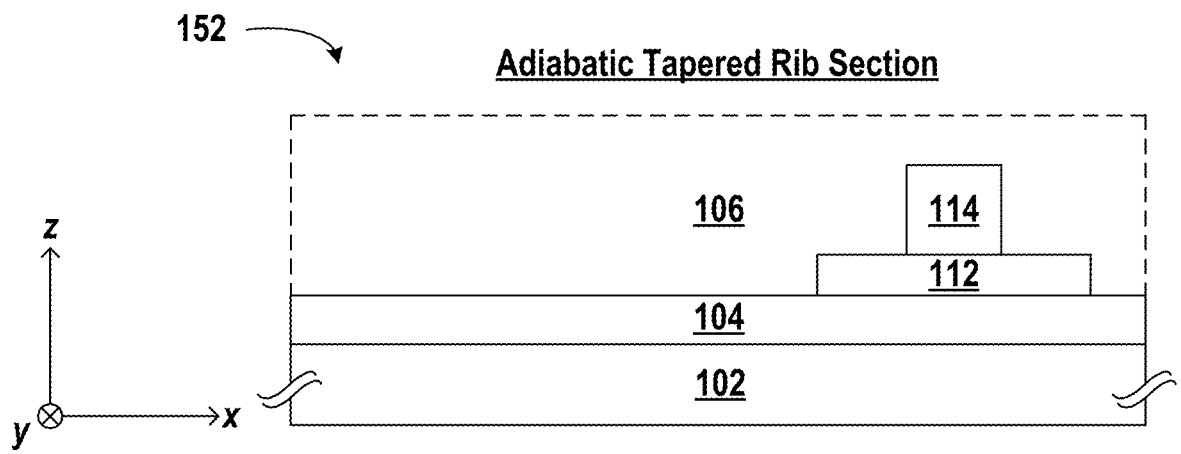
FIG. 1C is a cross-sectional illustration of a portion of a polarization rotator-splitter, according to example embodiments.
Figure 1D:
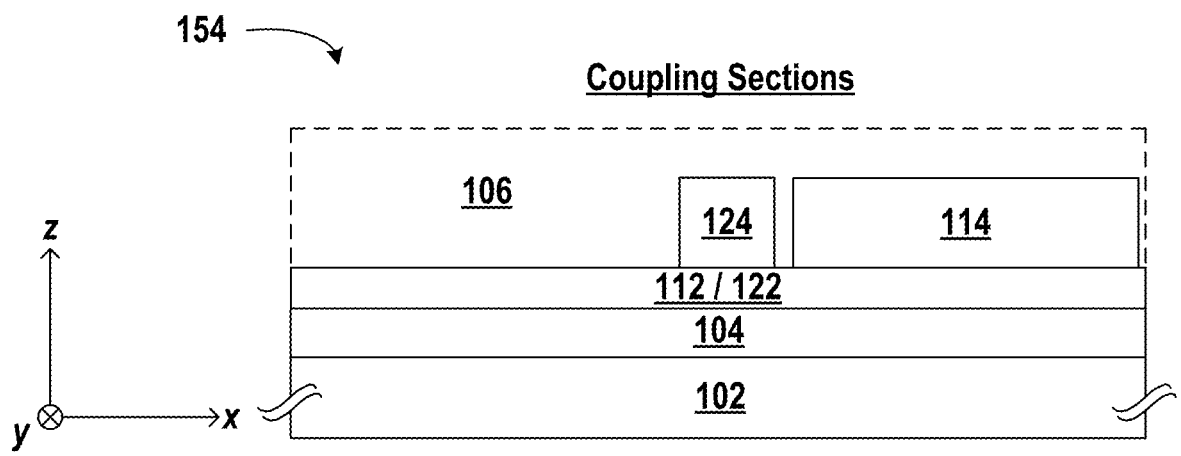
FIG. 1D is a cross-sectional illustration of a portion of a polarization rotator-splitter, according to example embodiments.
Figure 1E:
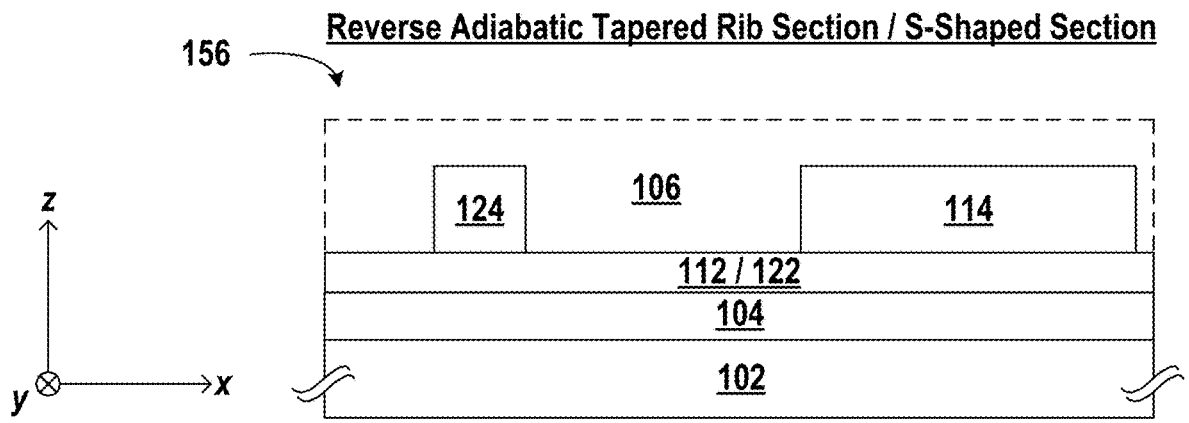
FIG. 1E is a cross-sectional illustration of a portion of a polarization rotator-splitter, according to example embodiments.
Figure 1F:
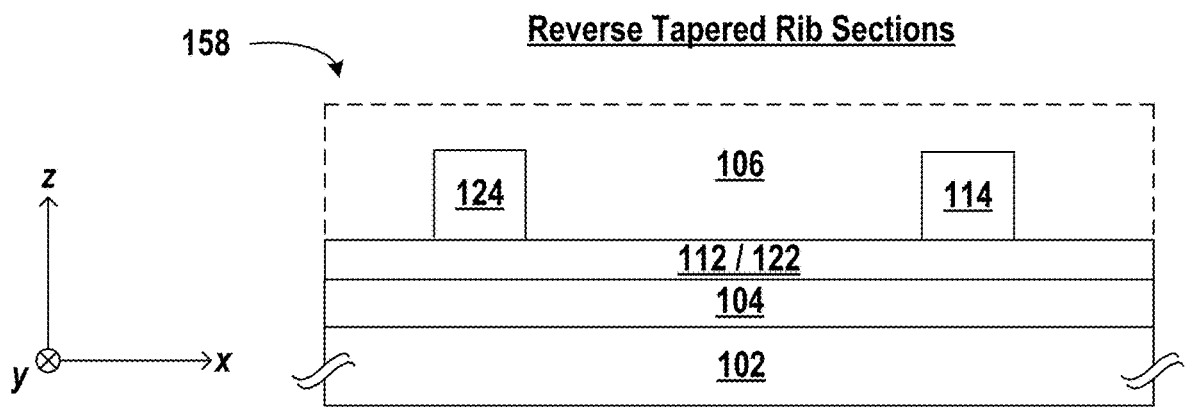
FIG. 1F is a cross-sectional illustration of a portion of a polarization rotator-splitter, according to example embodiments.
Figure 1G:
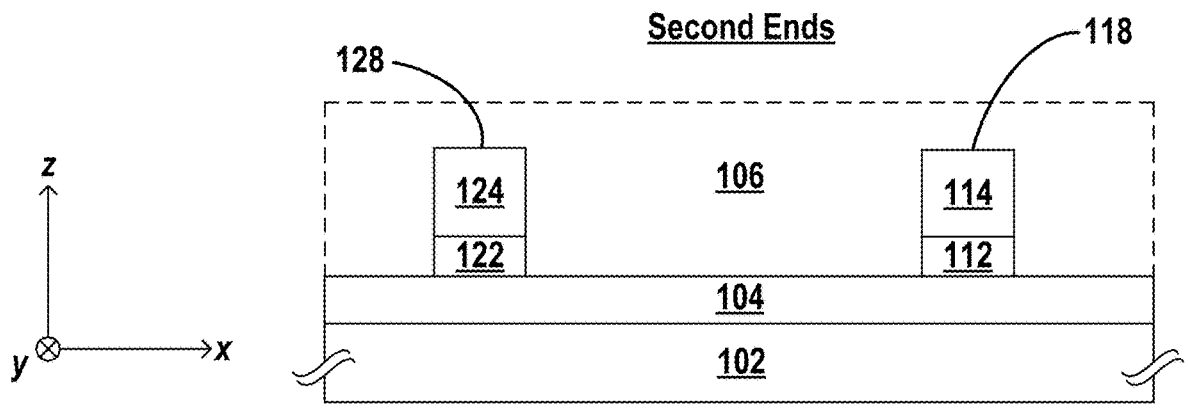
FIG. 1G is a cross-sectional illustration of a portion of a polarization rotator-splitter, according to example embodiments.

FIGS. 1B-1G illustrate cross sections of the device 100 at different positions (e.g., different y-positions, as illustrated in FIG. 1A), according to example embodiments. FIG. 1B in an illustration of a cross section of the device 100 at the beginning (e.g., minimum y position) of the mode-conversion section 150. FIG. 1C is an illustration of a cross section of the device 100 at the beginning (e.g., minimum y position) of the adiabatic tapered rib section 152. FIG. 1D is an illustration of a cross section of the device 100 at the beginning (e.g., minimum y position) of the coupling sections 154. FIG. 1E is an illustration of a cross section of the device 100 at the beginning (e.g., minimum y position) of the reverse adiabatic tapered rib section/s-shaped section 156. FIG. 1F is an illustration of a cross section of the device 100 at the beginning (e.g., minimum y position) of the reverse tapered rib sections 158. FIG. 1G is an illustration of a cross section of the device 100 at the second end 118 of the first waveguide 110 and the second end 128 of the second waveguide 120 (e.g., at an output end of the device 100, where the output end of the device 100 is located at a maximum y position of the device 100).

In the device 100 illustrated FIG. 1A, the first waveguide 110 may be configured to receive electromagnetic waves (i.e., signals) at a first end 116. In some embodiments, the first end 116 of the first waveguide 110 may be located at an input end of the device 100. In addition, the first end 116 of the first waveguide 110 may be electromagnetically coupled to (e.g., capable of optical communication with) a coherent optical transceiver (e.g., a coherent optical transceiver used within an optical interconnect of a computing device). The electromagnetic waves may have a plurality of polarizations and/or a plurality of mode-orders. For example, the coherent optical transceiver may interface with a communication channel (e.g., optical fiber) through which a plurality of multiplexed signals are transmitted. In some embodiments, the electromagnetic waves received at the first end 116 of the first waveguide 110 may include a first electromagnetic wave having a first polarization and a first mode-order. For example, the first electromagnetic wave may have a TE$_0$ mode. Similarly, the electromagnetic waves received at the first end 116 of the first waveguide 110 may include a second electromagnetic wave having a second polarization (e.g., as well a second mode-order). For example, the second electromagnetic wave may have a TM$_0$ mode.

After being received at the first end 116 of the first waveguide 110, the first electromagnetic wave and the second electromagnetic may propagate along the first waveguide 110 to the mode-conversion section 150 of the first waveguide 110 (e.g., and enter the mode-conversion section 150 at the interface illustrated in FIG. 1B). In some embodiments, the portion of the first waveguide 110 between the first end 116 of the first waveguide 110 and the mode-conversion section 150 of the first waveguide 110 may include a ridge waveguide. Other waveguides are also possible in this portion of the first waveguide 110. In some embodiments, the ridge waveguide may have a width (i.e., an x-dimension, as illustrated in FIG. 1A) of between 350 nm and 400 nm (e.g., 375 nm). In other embodiments, the ridge waveguide may have a width between 440 nm and 460 nm (e.g., 450 nm). Further, additional or alternative portions of the device 100 (e.g., portions of the first waveguide 110 near the second end 118 of the first waveguide 110 and/or portions of the second waveguide 120 near the second end 128 of the second waveguide 120) may include one or more ridge waveguides.

Propagation of electromagnetic waves along the first waveguide 110 and/or the second waveguide 120 may occur as a result of total internal reflection due to a mismatch between the material of the first waveguide 110/second waveguide 120 (e.g., Si or SiN) and the material of the surrounding first oxide layer 104 and second oxide layer 106 (e.g., SiO$_2$). The mismatch in materials may correspond to a mismatch in relative dielectric constants ($\varepsilon_r$)/refractive indices ($\eta$). For example, in embodiments where the first waveguide 110 and the second waveguide 120 are fabricated from Si and the first oxide layer 104 and the second oxide layer 106 are fabricated from SiO$_2$, there may be a mismatch of relative dielectric constants of ~11.68 ($\varepsilon_r$ of Si) to ~3.9 ($\varepsilon_r$ of SiO$_2$). It is understood that these values are given solely as examples, and that other materials may be used and/or the materials listed may have different relative dielectric constants depending on the wavelength of electromagnetic signal propagating within the materials. Substantial mismatches (e.g., greater than a factor of 2) in relative dielectric constants ($\varepsilon_r$)/refractive indices ($\eta$) can lead to total internal reflection even for relatively high angles of incidence (e.g., less than 30° relative to the normal vector of the surface interface).

The mode-conversion section 150 of the first waveguide 110 may include a tapered rib section. The tapered rib section may include a rib waveguide with the ridge 114 on the pedestal 112, as illustrated in FIG. 1A. The ridge 114 in the tapered rib section may have a width (i.e., an x-dimension, as illustrated) between 440 nm and 460 nm (e.g., 450 nm), in some embodiments. As illustrated, the pedestal 112 may taper from having a width (i.e., an x-dimension) equal to that of the ridge 114 (e.g., between 450 nm) at a first end of the tapered rib section (i.e., the portion of the tapered rib section with the lowest y position) to having a width of between 4.5 μm and 5.5 μm (e.g., 5.0 μm) at a second end of the tapered rib section (i.e., the portion of the tapered ridge section with the greatest y position). The length of the tapered rib section (i.e., the difference in y values between the first end and the second end of the tapered rib section) and/or the entire mode-conversion section 150 may be between 35 μm and 40 μm (e.g., 37.5 μm), in some embodiments. Additionally, the tapered rib section may allow the taper rib section to convert from one polarization/mode-order to another polarization/mode-order (e.g., from $TM_0$ modes to $TE_1$ modes).

Upon reaching the mode-conversion section 150 of the first waveguide 110, the first electromagnetic waves having the first polarization and first mode-order (the $TE_0$ waves) may propagate through to the adiabatic tapered rib section 152. The second electromagnetic waves having the second polarization, however, may be converted into waves having the first polarization and the first mode-order. For example, the second electromagnetic waves may be converted from having a $TM_0$ mode to having a $TE_1$ mode. This may correspond, in part, to a polarization "rotation," for example. After propagating through the mode-conversion section 150 of the first waveguide 110, the first electromagnetic waves (having $TE_0$ mode) and the second electromagnetic waves (having $TE_1$ mode) may enter the adiabatic tapered rib section 152 of the first waveguide 110 (e.g., at the interface illustrated in FIG. 1C).

As illustrated in FIG. 1A, the adiabatic tapered rib section 152 of the first waveguide 110 may connect the mode-conversion section 150 of the first waveguide 110 to the coupling section 154 of the first waveguide 110. The adiabatic tapered rib section 152 of the first waveguide 110 may include a tapered rib section that includes the ridge 114 on the pedestal 112, as illustrated in FIG. 1A. The pedestal 112 in the adiabatic tapered rib section 152 may have a width (i.e., an x-dimension, as illustrated) between 4.5 μm and 5.5 μm (e.g., 5.0 μm), in some embodiments. Alternatively, the pedestal 112 in the adiabatic tapered rib section 152 may be significantly wider, in some embodiments. For example, as illustrated in FIG. 1A, the pedestal 112 in the adiabatic tapered rib section 152 may be widened to match the width of the first oxide layer 104 (e.g., to completely cover the first oxide layer 104). In such embodiments, the first oxide layer 104 and the pedestal 112 in the adiabatic tapered rib section 152 may be wide enough to cover the entire handle layer 102 (e.g., between 199.9 mm and 200.1 mm in width). As illustrated in FIG. 1A, the ridge 114 in the adiabatic tapered rib section 152 of the first waveguide 110 may taper from the width of the first waveguide 110 at the first end 116 of the first waveguide 110 (e.g., between 440 nm and 460 nm) at a first end of the adiabatic tapered rib section 152 (i.e., the portion of the adiabatic tapered rib section 152 with the lowest y position) to a width of between 900 nm and 920 nm (e.g., 910 nm) at a second end of the adiabatic tapered rib section 152 (i.e., the portion of the adiabatic tapered rib section 152 with the greatest y position). In some embodiments, the length (i.e., y-distance between the first end and the second end) of the adiabatic tapered rib section 152 may be between 15 μm and 20 μm (e.g., 17.5 μm).

The first electromagnetic waves (having $TE_0$ mode) and the second electromagnetic waves (having $TE_1$ mode) may propagate from a first end of the adiabatic tapered rib section 152 of the first waveguide 110 (e.g., an end of the adiabatic tapered rib section 152 having the lowest y position) to a second end of the adiabatic tapered rib section 152 of the first waveguide 110 (e.g., an end of the adiabatic tapered rib section 152 having the greatest y position). Upon exiting the second end of the adiabatic tapered rib section 152 of the first waveguide 110, the first and second electromagnetic waves may enter the coupling section 154 of the first waveguide 110 (e.g., at the interface illustrated in FIG. 1D).

The coupling section 154 of the first waveguide 110 may have a length (i.e., a y-dimension) between 20 μm and 25 μm (e.g., 22.5 μm). In addition, the coupling section 154 of the first waveguide 110 may have a width (i.e., an x-dimension) between 900 nm and 920 nm (e.g., 910 nm). As illustrated in FIG. 1A, the coupling section 154 of the first waveguide 110 may be positioned adjacent to the coupling section 154 of the second waveguide 120. In some embodiments, for example, the coupling section 154 of the first waveguide 110 may be separated (e.g., in the x-direction) from the coupling section 154 of the second waveguide 120 by between 280 nm and 320 nm (e.g., 300 nm). In some embodiments, the coupling section 154 of the second waveguide 120 may likewise have a length (i.e., ay-dimension) between 20 μm and 25 μm (e.g., 22.5 μm). Further, the coupling section 154 of the second waveguide 120 (e.g., the ridge 124 of the coupling section 154 of the second waveguide 120) may be between 390 nm and 410 nm (e.g., 400 nm) in width (i.e., in x-dimension). Alternatively, in some embodiments, the coupling section 154 of the second waveguide 120 (e.g., the ridge 124 of the coupling section 154 of the second waveguide 120) may be between 440 nm and 460 nm (e.g., 450 nm) in width. Other widths for the coupling section 154 of the second waveguide 120 are also possible.

Also, as illustrated, the second waveguide 120 may begin at the coupling section 154. In other words, the first end 126 of the second waveguide 120 may coincide with the lowest y position of the coupling section 154 of the second waveguide 120. In other embodiments, however, other arrangements are also possible. For example, the first end 126 of the second waveguide 120 may be located at the same y position as the first end 116 of the first waveguide 110, at a y position between they position of the first end 116 of the first waveguide 110 and the lowest y position of the coupling section 154 of the second waveguide 120, or at ay position less than they position of the first end 116 of the first waveguide 110.

The first electromagnetic waves (having $TE_0$ mode) may propagate from a first end of the coupling section 154 of the first waveguide 110 (i.e., an end of the coupling section 154 of the first waveguide 110 having the lowest y position) to a second end of the coupling section 154 of the first waveguide 110 (i.e., an end of the coupling section 154 of the first waveguide 110 having the greatest y position) substantially unimpeded. The second electromagnetic waves (having $TE_1$ mode), however, may be substantially converted to a different mode-order and substantially coupled out of the coupling section 154 of the first waveguide 110 and into the coupling section 154 of the second waveguide 120. For example, the second electromagnetic waves may be converted from a $1^{st}$ mode-order to a fundamental mode-order (i.e., 0 mode-order) while being coupled into the coupling section 154 of the second waveguide 120. In other words, the second electromagnetic waves may be converted from having $TE_1$ mode to having $TE_0$ mode while being coupled from the first waveguide 110 to the second waveguide 120. In this way, the coupling sections 154 of the first waveguide 110 and the second waveguide 120 may perform a mode-splitting function and a mode-converting function (i.e., may split $TE_1$ modes off from $TE_0$ modes and, at the same time, convert the $TE_1$ modes to $TE_0$ modes). Hence, at the second end of the coupling section 154 of the first waveguide 110, primarily only the first electromagnetic waves (having $TE_0$ mode) may remain. Further, at the second end (i.e., an end of the coupling section 154 of the second waveguide 120 having the greatest y position) of the coupling section 154 of the second waveguide 120, primarily only the second electromagnetic waves (having $TE_0$ mode) may be present. As such the first electromagnetic waves (having $TE_0$ mode) may then propagate into the reverse adiabatic tapered rib section 156 of the first waveguide 110 and the second electromagnetic waves (having $TE_0$ mode) may propagate into the s-shaped section 156 of the second waveguide 120 (e.g., at the interface illustrated in FIG. 1E).

In some embodiments, the reverse adiabatic tapered rib section 156 of the first waveguide 110 may have the reverse dimensions of the adiabatic tapered rib section 152 of the first waveguide 110. For example, the dimensions of the pedestal 112 may be the same in the reverse adiabatic tapered rib section 156 of the first waveguide 110 and in the adiabatic tapered rib section 152 of the first waveguide 110. However, the reverse adiabatic tapered rib section 156 of the first waveguide 110 may include a ridge 114 that tapers from a width of between 900 nm and 920 nm (e.g., 910 nm) at a first end of the reverse adiabatic tapered rib section 156 (i.e., the end of the reverse adiabatic tapered rib section 156 with the lowest y position) to a width of between 440 nm and 460 nm (e.g., 450 nm) at a second end of the reverse adiabatic tapered rib section 156 (i.e., the end of the reverse adiabatic tapered rib section 156 with the greatest y position), rather than vice versa. Likewise, the length (i.e., y-dimension) between the first end of the reverse adiabatic tapered rib section 156 and the second end of the reverse adiabatic tapered rib section 156 may be the same as the length between the first end of the adiabatic tapered rib section 152 and the second end of the adiabatic tapered rib section 152 (e.g., 17.5 μm). In other embodiments, though, the reverse adiabatic tapered rib section 156 may not exactly inversely mirror the adiabatic tapered rib section 152. For example, the length between the first end of the reverse adiabatic tapered rib section 156 and the second end of the reverse adiabatic tapered rib section 156 may be longer (e.g., between 20 μm and 25 μm) or shorter (e.g., between 10 μm and 15 μm) than the adiabatic tapered rib section 152. Other differences between the reverse adiabatic tapered rib section 156 and the adiabatic tapered rib section 152 are also possible and contemplated herein.

The s-shaped section 156 of the second waveguide 120 may be used to ultimately separate the second end 128 (i.e., the output end) of the second waveguide 120 from the second end 118 (i.e., the output end) of the first waveguide 110. For example, the s-shaped section 156 may shift the second waveguide 120 laterally (e.g., in an x-direction) away from the first waveguide 110. For instance the s-shape of the second waveguide 120 may offset the second end 128 of the second waveguide 120 from the first end 126 of the second waveguide 120 (e.g., in an x-direction) by between 8 μm and 12 μm (e.g., 10 μm). This offset may occur over the length (i.e., in the y-direction) of the s-shaped section 156 of the second waveguide 120 (e.g., between 18 μm and 22 μm). As illustrated, the length of the s-shaped section 156 of the second waveguide 120 may match the length of the reverse adiabatic tapered rib section 156 of the first waveguide 110, in some embodiments. In other embodiments, the length of the s-shaped section 156 of the second waveguide 120 may be different from the length of the reverse adiabatic tapered rib section 156 of the first waveguide 110.

Upon entering the reverse adiabatic tapered rib section 156 of the first waveguide 110, the first electromagnetic waves ($TE_0$ mode) may propagate from a first end of the reverse adiabatic tapered rib section 156 of the first waveguide 110 (i.e., an end having the lowest y position) to a second end of the reverse adiabatic tapered rib section 156 of the first waveguide 110 (i.e., an end having the greatest y position). The first electromagnetic waves may then enter the reverse tapered rib section 158 of the first waveguide 110 (e.g., at the interface illustrated in FIG. 1F).

Similarly, upon entering the s-shaped section 156 of the second waveguide 120, the second electromagnetic waves ($TE_0$ mode) may propagate from a first end of the s-shaped section 156 of the second waveguide 120 (i.e., an end having the lowest y position) to a second end of the s-shaped section 156 of the second waveguide 120 (i.e., an end having the greatest y position). The second electromagnetic waves may then enter the reverse tapered rib section 158 of the second waveguide 120 (e.g., at the interface illustrated in FIG. 1F).

The reverse tapered rib sections 158 of the first waveguide 110 and the second waveguide 120 may taper the first waveguide 110 and the second waveguide 120, respectively, from rib waveguides to ridge waveguides. In this way, such that the first waveguide 110 and the second waveguide 120 may be ridge waveguides at the second ends 118/128 of the respective waveguides. Ridge waveguides may be capable of being readily routed to additional waveguides outside of the device 100 (e.g., at an output end of the device 100).

In some embodiments, the reverse tapered rib section 158 of the first waveguide 110 may have the reverse dimensions of the mode-conversion section 150 of the first waveguide 110. For example, the dimensions of the ridge 114 may be the same in the reverse tapered rib section 158 of the first waveguide 110 and in the mode-conversion section 150 of the first waveguide 110. However, the reverse tapered rib section 158 of the first waveguide 110 may include a pedestal 112 that tapers from a width of between 4.5 μm and 5.5 μm (e.g., 5.0 μm) at a first end of the reverse tapered rib section 158 of the first waveguide 110 (i.e., the end of the reverse tapered rib section 158 with the lowest y position) to a width of between 440 nm and 460 nm (e.g., 450 nm) at a second end of the reverse tapered rib section 158 of the first waveguide 110 (i.e., the end of the reverse tapered rib section 158 with the greatest y position), rather than vice versa. Likewise, the length (i.e., y-distance) between the first end of the reverse tapered rib section 158 and the second end of the reverse tapered rib section 158 may be the same as the length between the first end of the mode-conversion section 150 and the second end of the mode-conversion section 150 (e.g., 37.5 μm). In other embodiments, though, the reverse tapered rib section 158 of the first waveguide 110 may not exactly inversely mirror the mode-conversion section 150. For example, the length between the first end of the reverse tapered rib section 158 and the second end of the reverse tapered rib section 158 may be longer (e.g., between 40 μm and 45 µm) or shorter (e.g., between 30 µm and 35 µm) than the mode-conversion section 150. Other differences between the reverse tapered rib section 158 of the first waveguide 110 and the mode-conversion section 150 are also possible and contemplated herein.

Likewise, the reverse tapered rib section 158 of the second waveguide 120 may have the reverse dimensions of the mode-conversion section 150 of the first waveguide 110. For example, the dimensions of the ridge 114 may be the same in the reverse tapered rib section 158 of the second waveguide 120 and in the mode-conversion section 150 of the first waveguide 110. However, the reverse tapered rib section 158 of the second waveguide 120 may include a pedestal 122 that tapers from a width of between 4.5 µm and 5.5 µm (e.g., 5.0 µm) at a first end of the reverse tapered rib section 158 of the second waveguide 120 (i.e., the end of the reverse tapered rib section 158 with the lowest y position) to a width of between 440 nm and 460 nm (e.g., 450 nm) at a second end of the reverse tapered rib section 158 of the second waveguide 120 (i.e., the end of the reverse tapered rib section 158 with the greatest y position), rather than vice versa. Likewise, the length (i.e., y-dimension) between the first end of the reverse tapered rib section 158 and the second end of the reverse tapered rib section 158 may be the same as the length between the first end of the mode-conversion section 150 and the second end of the mode-conversion section 150 (e.g., 37.5 µm). In other embodiments, though, the reverse tapered rib section 158 of the second waveguide 120 may not exactly inversely mirror the mode-conversion section 150. For example, the length between the first end of the reverse tapered rib section 158 and the second end of the reverse tapered rib section 158 may be longer (e.g., between 40 µm and 45 µm) or shorter (e.g., between 30 µm and 35 µm) than the mode-conversion section 150. Other differences between the reverse tapered rib section 158 of the second waveguide 120 and the mode-conversion section 150 are also possible and contemplated herein.

Based on the description above, it is understood that the reverse tapered rib section 158 of the first waveguide 110 and the reverse tapered rib section 158 of the second waveguide 120 may have the same dimensions. This need not be the case, however. In some embodiments, the taper of the reverse tapered rib section 158 of the second waveguide 120 may differ from the taper of the reverse tapered rib section 158 of the first waveguide 110. Additionally or alternatively, the length of the reverse tapered rib section 158 of the second waveguide 120 may differ from the taper of the reverse tapered rib section 158 of the first waveguide 110.

Upon entering the reverse tapered rib section 158 of the first waveguide 110, the first electromagnetic waves (TE$_0$ mode) may propagate from a first end of the reverse tapered rib section 158 of the first waveguide 110 (i.e., an end having the lowest y position) to a second end of the reverse tapered rib section 158 of the first waveguide 110 (i.e., an end having the greatest y position). The first electromagnetic waves may then propagate through a ridge waveguide and be emitted from the second end 118 of the first waveguide 110 (e.g., at the interface illustrated in FIG. 1G).

Likewise, upon entering the reverse tapered rib section 158 of the second waveguide 120, the converted second electromagnetic waves (TE$_0$ mode) may propagate from a first end of the reverse tapered rib section 158 of the second waveguide 120 (i.e., an end having the lowest y position) to a second end of the reverse tapered rib section 158 of the second waveguide 120 (i.e., an end having the greatest y position). The converted second electromagnetic waves (having TE$_0$ mode) may then propagate through a ridge waveguide and be emitted from the second end 128 of the second waveguide 120 (e.g., at the interface illustrated in FIG. 1G).

As described above, the device 100 illustrated in FIG. 1A may include a mode-conversion section 150 of the first waveguide 110 and an adiabatic tapered rib section 152 of the first waveguide 110. As illustrated in FIG. 1A, these two sections 150, 152 of the first waveguide 110 may be sequential to one another. In other embodiments, though, the mode-converting section of the first waveguide and the adiabatic tapered rib section of the first waveguide may occur within the same segment of the first waveguide. Such an embodiment is illustrated in FIG. 2.

Figure 2:
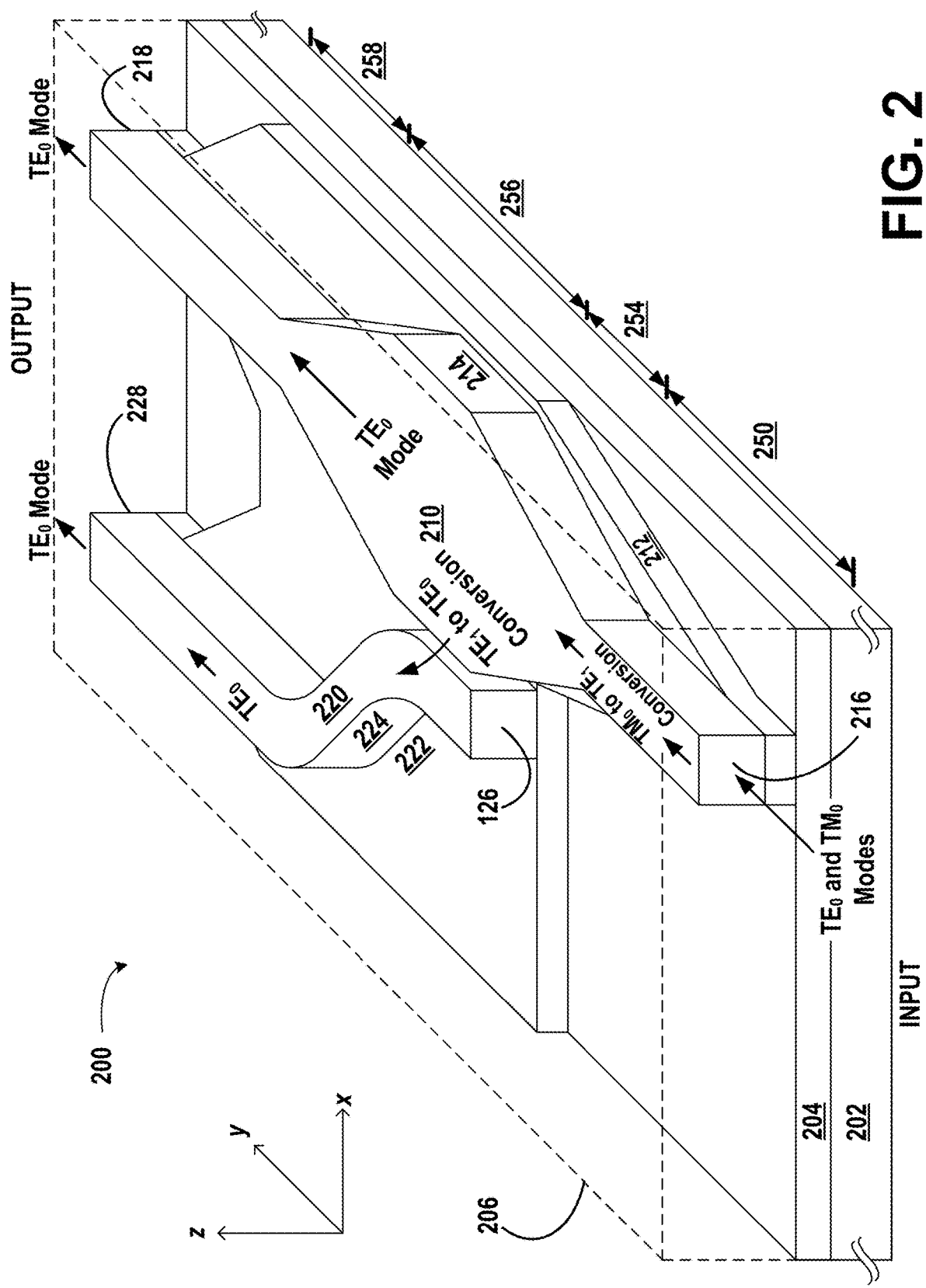
FIG. 2 is an isometric illustration of a polarization rotator-splitter, according to example embodiments.

FIG. 2 illustrates a device 200 configured as a polarization rotator-splitter. Like the device 100 of FIG. 1A, the device 200 may include a handle layer 202, a first oxide layer 204 on the handle layer 202, a second oxide layer 206, a first waveguide 210, and a second waveguide 220. The second oxide layer 206 may cover portions of the handle layer 202, the first oxide layer 204, the first waveguide 210, and/or the second waveguide 220 in various regions of the device 200 and/or in various embodiments. Also like FIG. 1A, the second oxide layer 206 has is illustrated using dashed lines and has been made transparent in FIG. 2 for to make the other components of the device 200 visible in the drawing. As illustrated, at least a portion of the first waveguide 210 and at least a portion of the second waveguide 220 may be encapsulated between the first oxide layer 204 and the second oxide layer 206. The first waveguide 210 may include a first end 216 (e.g., an input end) and a second end 218 (e.g., an output end). Similarly, the second waveguide 220 may include a first end 226 (e.g., an input end) and a second end 228 (e.g., an output end). The first end 216 of the first waveguide 210 may be electromagnetically coupled to a coherent optical transceiver (e.g., to receive input electromagnetic signals at the first end 216 of the first waveguide 210), in some embodiments. In addition, at least a portion of the first waveguide 210 may include a rib waveguide. The rib waveguide of the first waveguide 210 may include a pedestal 212 and a ridge 214. Likewise, at least a portion of the second waveguide 220 may include a rib waveguide. The rib waveguide of the second waveguide 220 may include a pedestal 222 and a ridge 224.

Also like the device 100 of FIG. 1A, the device 200 illustrated in FIG. 2 may include coupling sections 254 (e.g., a coupling section of the first waveguide 210 and a coupling section of the second waveguide 220), a reverse adiabatic tapered rib section/s-shaped section 256 (e.g., a reverse adiabatic tapered rib section of the first waveguide 210 and an s-shaped section of the second waveguide 220), and reverse tapered rib sections 258 (e.g., a reverse tapered rib section of the first waveguide 210 and a reverse tapered rib section of the second waveguide 220). In other words, the first waveguide 210, for example, may include a coupling section 254, a reverse adiabatic tapered rib section 256, and a reverse tapered rib section 258. Additionally, the second waveguide 220 may include a coupling section 254, an s-shaped section 256, and a reverse tapered rib section 258. However, unlike the device 100 of FIG. 1A, the device 200 illustrated in FIG. 2 does not include a mode-conversion section 150 separate from an adiabatic tapered rib section 152. Instead, as illustrated in FIG. 2, the device 200 includes an adiabatic tapered rib mode-conversion section 250. As such, the device 200 illustrated in FIG. 2 may be configured to receive electromagnetic waves having wavelengths between 1260 nm and 1360 nm (e.g., electromagnetic waves in the O-band).

The adiabatic tapered rib mode-conversion section 250 of the first waveguide 210 may have a length between 35 μm and 40 μm (e.g., 37.5 μm). Further, the adiabatic tapered rib mode-conversion section 250 of the first waveguide 210 may include a tapered rib that has a tapered pedestal 212 and an adiabatic tapered ridge 214 on the tapered pedestal 212. The adiabatic tapered ridge 214 may have a width (i.e., an x-dimension, as illustrated in FIG. 2) that tapers from between 440 nm and 460 nm (e.g., 450 nm) at a first end of the adiabatic tapered rib mode-conversion section 250 (i.e., at an end of the adiabatic tapered rib mode-conversion section 250 having the lowest y-value) to a width between 900 nm and 920 nm at a second end of the adiabatic tapered rib mode-conversion section 250 (i.e., at an end of the adiabatic tapered rib mode-conversion section 250 having the greatest y-value). Additionally, the tapered pedestal 212 may have a width (i.e., an x-dimension, as illustrated in FIG. 2) that tapers from a minimum width of the adiabatic tapered ridge 214 (e.g., the width of the adiabatic tapered ridge 214 at the first end of the adiabatic tapered rib mode-conversion section 250) to a width between 4.5 μm and 5.5 μm (e.g., 5.0 μm). Like the mode-conversion section 150 of the first waveguide 110 in the device 100 of FIG. 1A, the adiabatic tapered rib mode-conversion section 250 of the first waveguide 210 in the device 200 of FIG. 2 may be configured to convert received electromagnetic waves having certain polarizations and mode-orders to other polarizations and/or mode-orders (e.g., convert received electromagnetic waves having the $TM_0$ mode into electromagnetic waves having the $TE_1$ mode).

Other than having a combination adiabatic tapered rib mode-conversion section 250, the device 200 of FIG. 2 may match the device 100 of FIG. 1A. Hence, if the device 200 receives first electromagnetic waves having the $TE_0$ mode and second electromagnetic waves having the $TM_0$ mode, once the first and second electromagnetic waves reach the coupling section 254 of the first waveguide 210, the propagation of the first and second electromagnetic waves along the device 200 may behave similarly to the propagation of the first and second electromagnetic waves along the device 100 described above with reference to FIG. 1A.

Figure 3A:
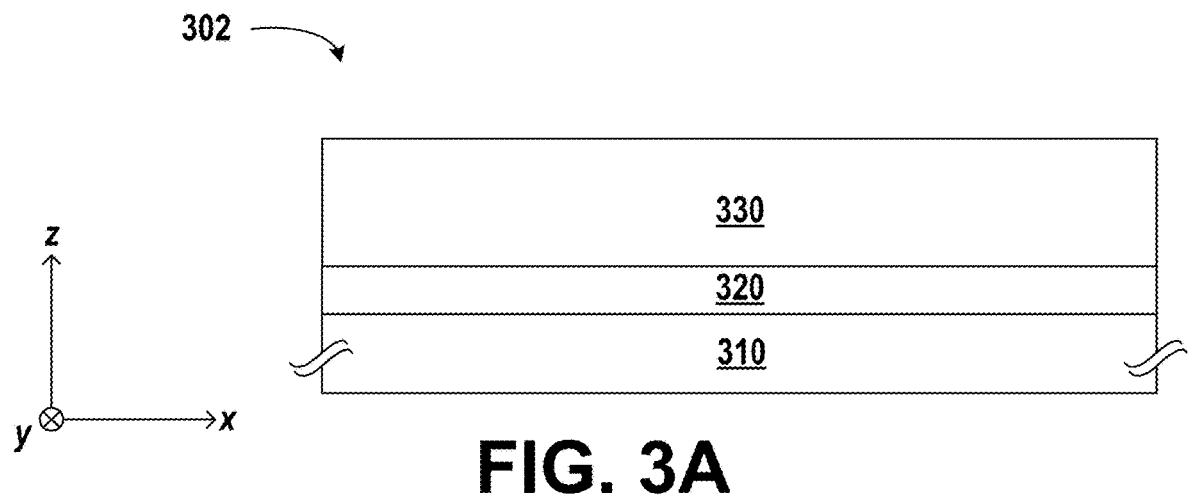
FIG. 3A illustrates a step of a fabrication technique, according to example embodiments.
Figure 3B:
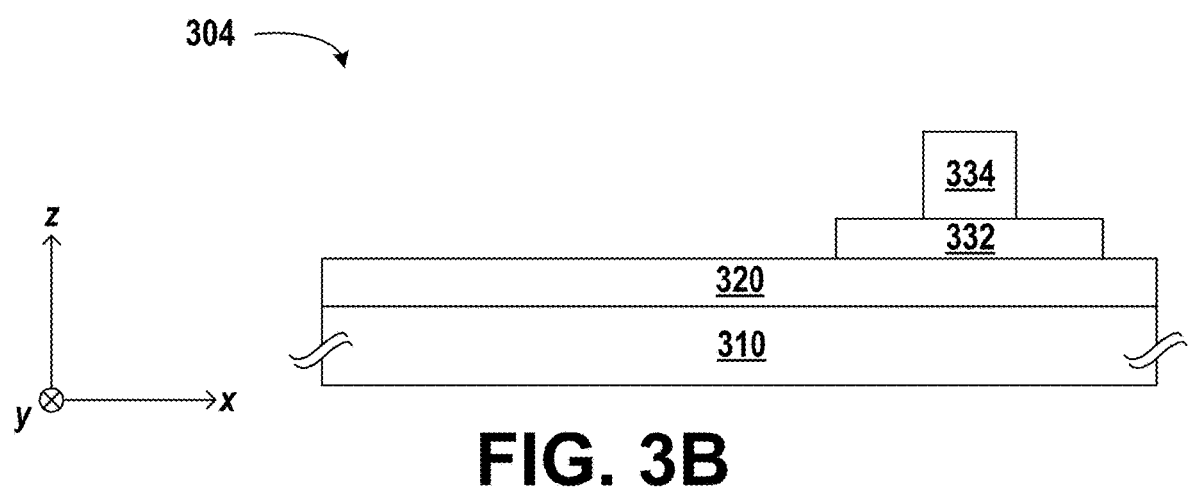
FIG. 3B illustrates a step of a fabrication technique, according to example embodiments.
Figure 3C:
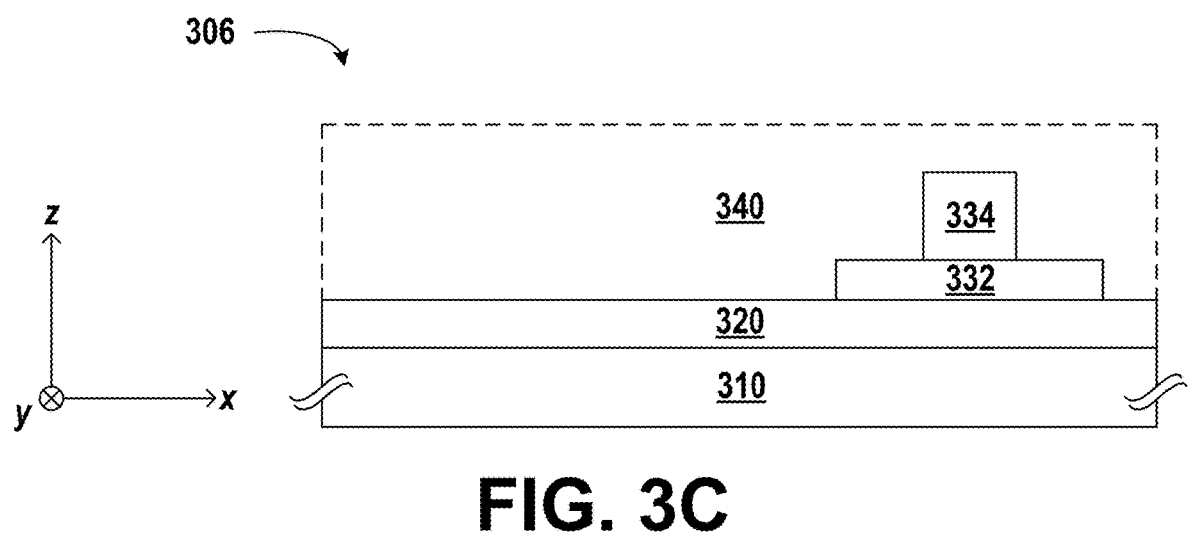
FIG. 3C illustrates a step of a fabrication technique, according to example embodiments.

FIGS. 3A-3C are illustrations of step of a fabrication technique, according to example embodiments. The fabrication technique may be used to fabricate the device 100 of FIG. 1A or the device 200 of FIG. 2, for example. In some embodiments, one or more of the fabrication steps illustrated in FIGS. 3A-3C may be performed in a cleanroom or other microelectronics fabrication facility. It is understood that the fabrication technique illustrated FIGS. 3A-3C is provided solely as an example and that other techniques are possible and are contemplated herein. For example, additional or alternative fabrication steps may be performed to fabricate the device 100 of FIG. 1A or the device 200 of FIG. 2. It is further understood that the illustrations of FIGS. 3A-3C are provided for understanding and that drawings are not necessarily to scale (e.g., the relative thicknesses and widths of the layers may be different than illustrated).

FIG. 3A illustrates an initialization step 302 of the fabrication technique. The initialization step 302 may include providing a substrate. The substrate may include a handle layer 310 (e.g., the handle layer 102 illustrated in FIG. 1A), a first oxide layer 320 (e.g., the first oxide layer 104 illustrated in FIG. 1A), and a device layer 330 on the first oxide layer 320. As illustrated, the first oxide layer 320 may be provided on the handle layer 310. In some embodiments, the handle layer 310, the first oxide layer 320, and the device layer 330 may be provided together as a previously fabricated SOI wafer. In some embodiments, the handle layer 310 may be a portion of a Si wafer (e.g., having thickness between 710 μm and 740 μm). Further, the first oxide layer 320 may be a $SiO_2$ layer (e.g., having thickness between 1.9 μm and 2.1 μm). In addition, the device layer 330 may be a Si layer (e.g., having thickness between 200 nm and 240 nm).

FIG. 3B illustrates a selective etching process 304 of the fabrication technique. As illustrated in FIG. 3B, the device layer 330 may be selectively etched (e.g., using a chemical etch) to form a pedestal 332 and a ridge 334. The pedestal 332 and the ridge 334 may correspond to the pedestal 112 and the ridge 114 of a rib waveguide in the device 100 illustrated in FIG. 1A, for example. Further, performing the selective etching process 304 may define a first waveguide and a second waveguide (e.g., the first waveguide 110 and the second waveguide 120 illustrated in FIG. 1A). In some embodiments, the selective etching process 304 may include multiple selective etches (e.g., as illustrated in FIGS. 4A-6C). Further, the selective etching process 304 may include one or more wet etch steps and/or dry etch steps. Additionally or alternatively, the selective etching process 304 may include one or more photolithography processing steps (e.g., to define one or more masks used to perform one or more selective etches). In various embodiments, the etch depth(s) used to etch the pedestal 332 and/or the ridge 334 may be different. For example, in some embodiments, the selective etching process 304 may be performed such that the pedestal 332 has a thickness (i.e., z-dimension) between 60 nm and 80 nm (e.g., 70 nm) and the ridge 334 has a thickness (i.e., z-dimension) between 140 nm and 160 nm (e.g., 150 nm). Alternatively, the selective etching process 304 may be performed such that the pedestal 332 has a thickness between 140 nm and 160 nm (e.g., 150 nm) and the ridge 334 has a thickness between 60 nm and 80 nm (e.g., 70 nm). Other relative thicknesses are also possible and are contemplated herein.

FIG. 3C illustrates an oxide providing step 306 of the fabrication technique. Step 306 may include providing a second oxide layer 340 (e.g., the second oxide layer 106 illustrated in FIG. 1A) on the pedestal 332, the ridge 334, and/or the first oxide layer 320. This may encapsulate the pedestal 332 and the ridge 334 between the first oxide layer 320 and the second oxide layer 340, for example. Further, in some embodiments, the second oxide layer 340 may be provided on at least a portion of the first waveguide and at least a portion of the second waveguide such that at least a portion of the first waveguide and at least a portion of the second waveguide are encapsulated between the first oxide layer and the second oxide layer. In some embodiments, the second oxide layer 340 may be a $SiO_2$ layer (e.g., having thickness between 1.9 μm and 2.1 μm). Additionally, the second oxide layer 340 may be deposited (e.g., using chemical vapor deposition). Alternatively, the second oxide layer 340 may be grown (e.g., using a dry or wet thermal oxidation).

Figure 4A:
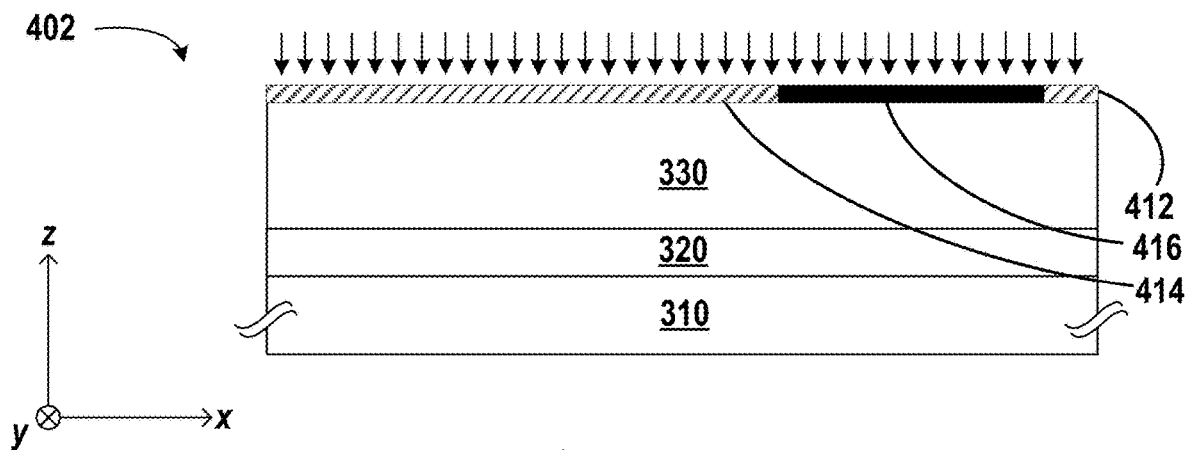
FIG. 4A illustrates a step of a selective etching technique, according to example embodiments.
Figure 4B:
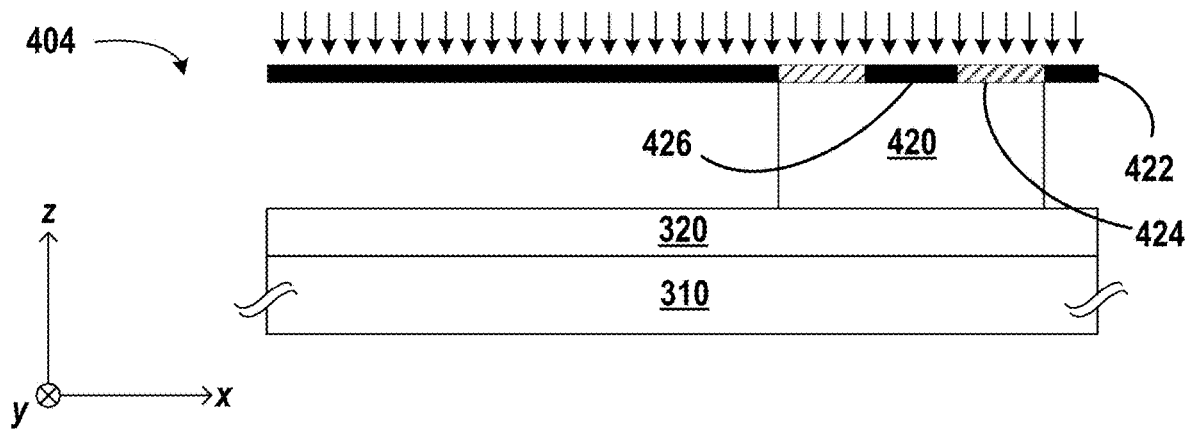
FIG. 4B illustrates a step of a selective etching technique, according to example embodiments.
Figure 4C:
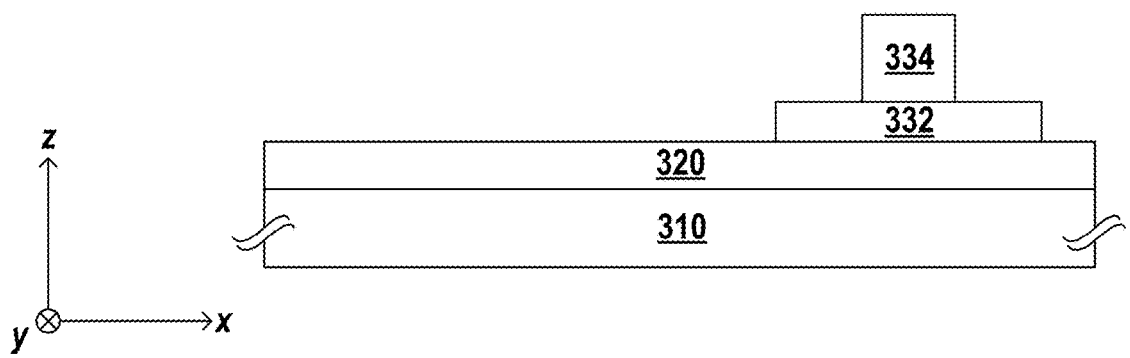
FIG. 4C illustrates a step of a selective etching technique, according to example embodiments.

FIGS. 4A-4C are illustrations of steps of a selective etching process. For example, each of the steps illustrated in FIGS. 4A-4C may be performed to accomplish the selective etching process 304 used to define the pedestal 332 and the ridge 334, as illustrated in FIG. 3B.

FIG. 4A is an illustration of a first selective etch 402. The first selective etch 402 may be performed using a first mask 412 (e.g., a mask defined using photolithography). The first mask 412 may include open portions 414 below which an etch may occur and closed portions 416 below which an etch may be prevented from occurring. In this way, regions of the device layer 330 below the open portions 414 of the first mask 412 may be etched away while the regions of the device layer 330 below the closed portions 416 of the first mask 412 may remain intact. The first selective etch 402 of FIG. 4A may result in an intermediate layer 420 being defined in the device layer 330. In some embodiments, the thickness of the pedestal 332 plus the thickness of the ridge 334 may be equal to the thickness of the intermediate layer 420.

FIG. 4B is an illustration of a second selective etch 404 (e.g., performed after the first selective etch 402). The second selective etch 404 may be performed using a second mask 422 (e.g., a hard or soft mask defined using photolithography). The second mask 422 may include open portions 424 below which an etch may occur and closed portions 426 below which an etch may be prevented from occurring. In this way, regions of intermediate layer 420 below the open portions 424 of the second mask 422 may be etched away while the regions of intermediate layer 420 below the closed portions 426 of the second mask 422 may remain intact. The second selective etch 404 of FIG. 4B may result in splitting the intermediate layer 420 into the pedestal 332 and the ridge 334. The result is illustrated in FIG. 4C, for example.

Figure 5A:
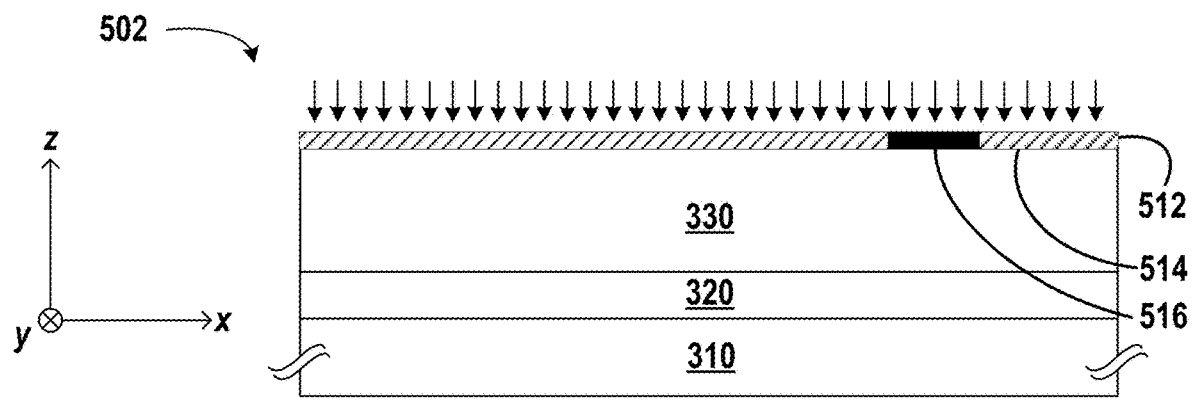
FIG. 5A illustrates a step of a selective etching technique, according to example embodiments.
Figure 5B:
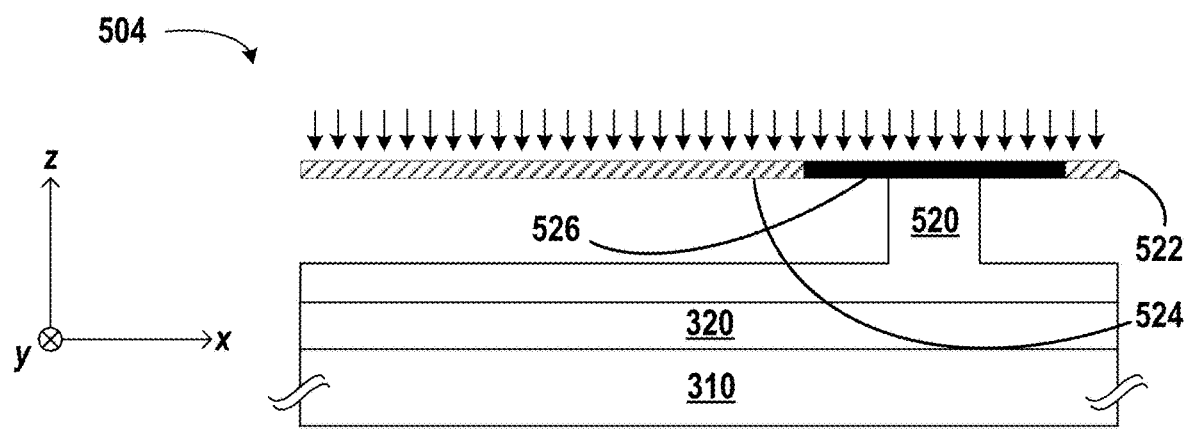
FIG. 5B illustrates a step of a selective etching technique, according to example embodiments.
Figure 5C:
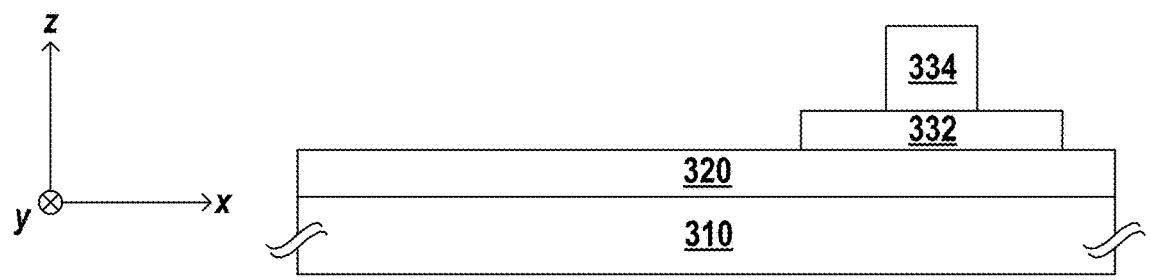
FIG. 5C illustrates a step of a selective etching technique, according to example embodiments.

FIGS. 5A-5C are illustrations of steps of a selective etching process. For example, each of the steps illustrated in FIGS. 5A-5C may be performed to accomplish the selective etching process 304 used to define the pedestal 332 and the ridge 334, as illustrated in FIG. 3B.

FIG. 5A is an illustration of a first selective etch 502. The first selective etch 502 may be performed using a first mask 512 (e.g., a mask defined using photolithography). The first mask 512 may include open portions 514 below which an etch may occur and closed portions 516 below which an etch may be prevented from occurring. In this way, regions of the device layer 330 below the open portions 514 of the first mask 512 may be etched away while the regions of the device layer 330 below the closed portions 516 of the first mask 512 may remain intact. The first selective etch 502 of FIG. 5A may result in an intermediate layer 520 being defined in the device layer 330. In some embodiments, the intermediate layer 520 may have a thickness of the ridge 334 plus the thickness of the pedestal 332 in a region corresponding to the ridge 334. Further, the intermediate layer 520 may have a thickness equal to the thickness of the pedestal 332 in all regions of the intermediate layer 520 that do not corresponding to the ridge 334.

FIG. 5B is an illustration of a second selective etch 504 (e.g., performed after the first selective etch 502). The second selective etch 504 may be performed using a second mask 522 (e.g., a mask defined using photolithography). The second mask 522 may include open portions 524 below which an etch may occur and closed portions 526 below which an etch may be prevented from occurring. In this way, regions of intermediate layer 520 below the open portions 524 of the second mask 522 may be etched away while the regions of intermediate layer 520 below the closed portions 526 of the second mask 522 may remain intact. The second selective etch 504 of FIG. 5B may result in splitting the intermediate layer 520 into the pedestal 332 and the ridge 334. The result is illustrated in FIG. 5C, for example.

Figure 6A:
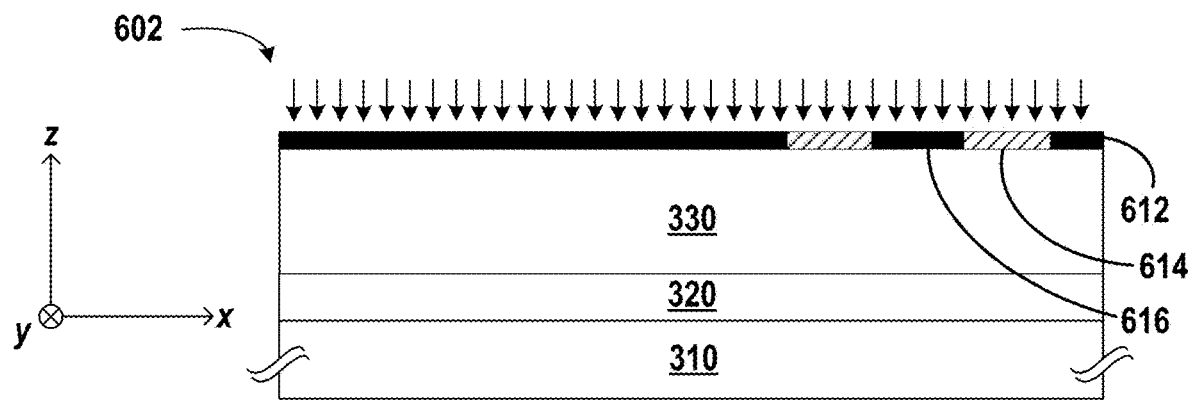
FIG. 6A illustrates a step of a selective etching technique, according to example embodiments.
Figure 6B:
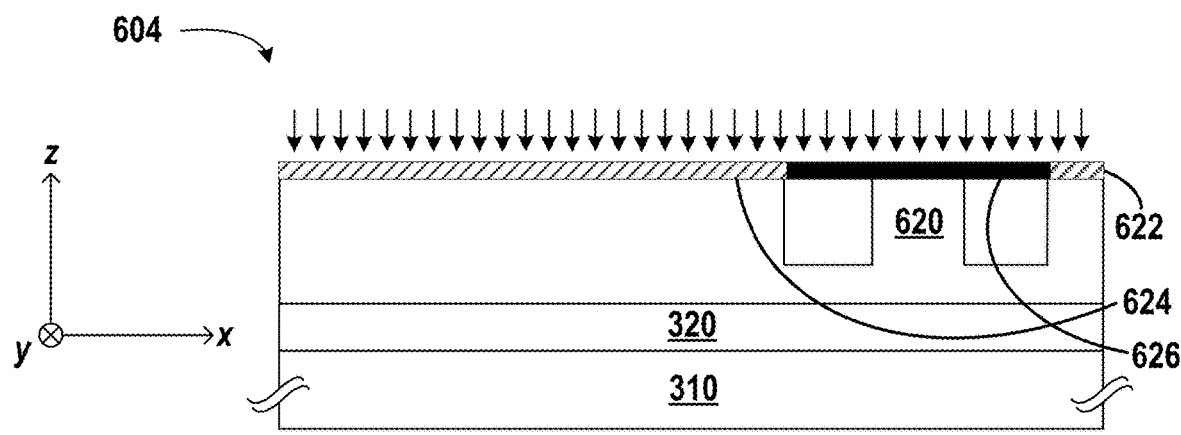
FIG. 6B illustrates a step of a selective etching technique, according to example embodiments.
Figure 6C:
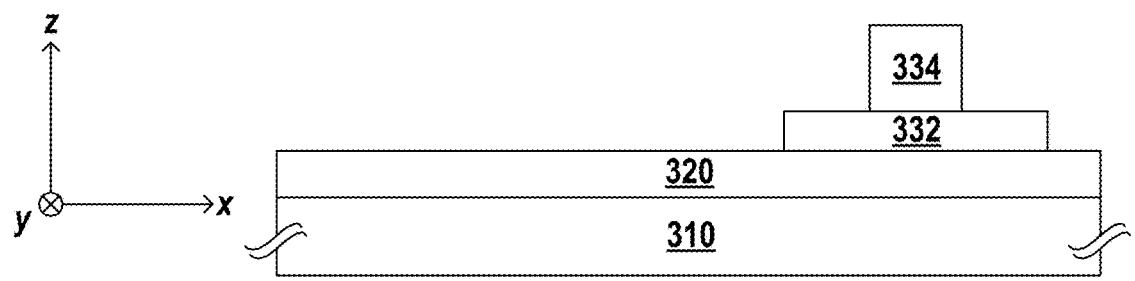
FIG. 6C illustrates a step of a selective etching technique, according to example embodiments.

FIGS. 6A-6C are illustrations of steps of a selective etching process. For example, each of the steps illustrated in FIGS. 6A-6C may be performed to accomplish the selective etching process 304 used to define the pedestal 332 and the ridge 334, as illustrated in FIG. 3B.

FIG. 6A is an illustration of a first selective etch 602. The first selective etch 602 may be performed using a first mask 612 (e.g., a hard or soft mask defined using photolithography). The first mask 612 may include open portions 614 below which an etch may occur and closed portions 616 below which an etch may be prevented from occurring. In this way, regions of the device layer 330 below the open portions 614 of the first mask 612 may be etched away while the regions of the device layer 330 below the closed portions 616 of the first mask 612 may remain intact. The first selective etch 602 of FIG. 6A may result in an intermediate layer 620 being defined in the device layer 330. In some embodiments, the intermediate layer 620 may have a thickness of the ridge 334 plus the thickness of the pedestal 332 in a region corresponding to the ridge 334 and in regions corresponding to neither the ridge 334 nor the pedestal 332. Further, the intermediate layer 620 may have a thickness equal to the thickness of the pedestal 332 in all regions of the intermediate layer 620 that correspond only to the pedestal 332.

FIG. 6B is an illustration of a second selective etch 604 (e.g., performed after the first selective etch 602). The second selective etch 604 may be performed using a second mask 622 (e.g., a mask defined using photolithography). The second mask 622 may include open portions 624 below which an etch may occur and closed portions 626 below which an etch may be prevented from occurring. In this way, regions of intermediate layer 620 below the open portions 624 of the second mask 622 may be etched away while the regions of intermediate layer 620 below the closed portions 626 of the second mask 622 may remain intact. The second selective etch 604 of FIG. 6B may result in etching away portions of the intermediate layer 620 that correspond to neither the pedestal 332 nor the ridge 334. The result is illustrated in FIG. 6C, for example.

III. EXAMPLE PROCESSES

Figure 7:
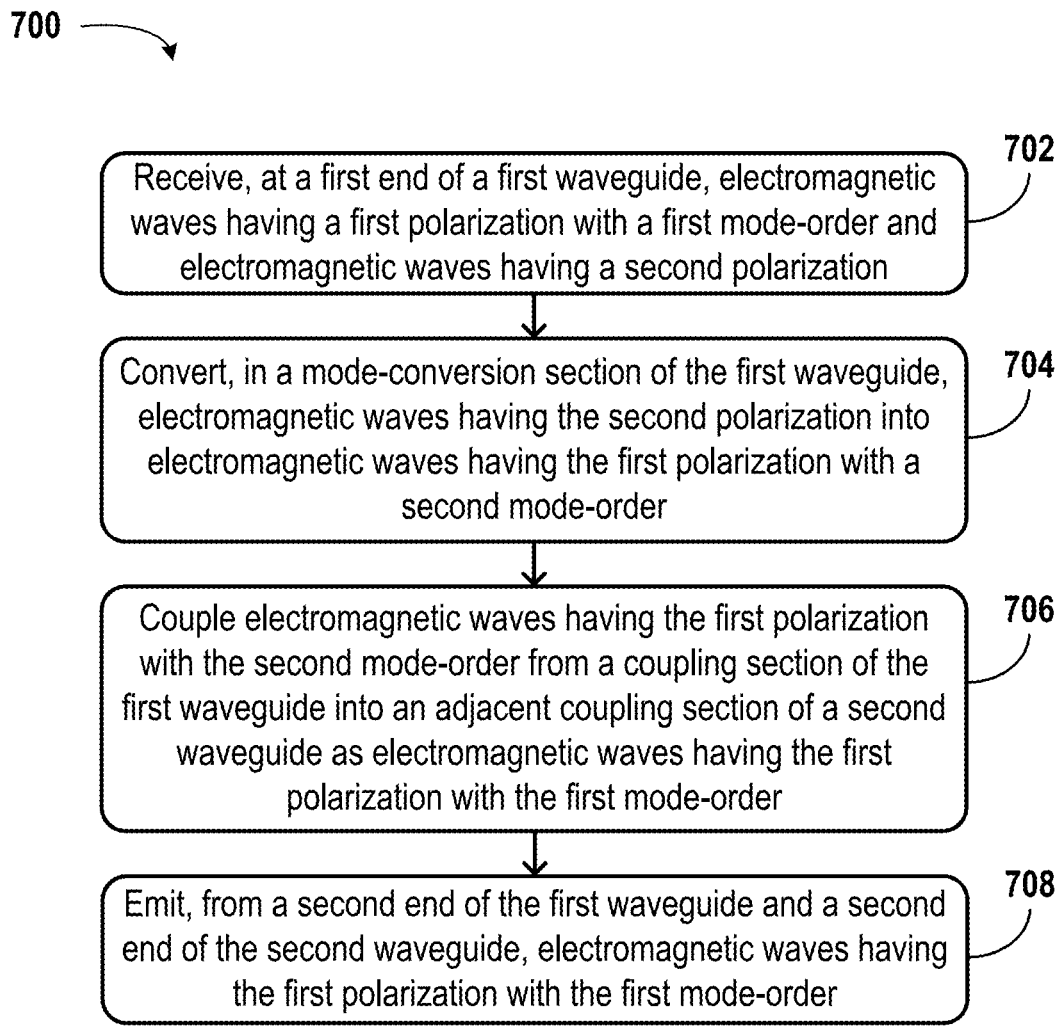
FIG. 7 is a flowchart illustrating a method, according to example embodiments.

FIG. 7 is a flowchart diagram of a method 700, according to example embodiments. The method 700 may be performed by a device (e.g., the device 100 illustrated and described with reference to FIG. 1A).

At block 702, the method 700 may include receiving, at a first end of a first waveguide, electromagnetic waves having a first polarization with a first mode-order and electromagnetic waves having a second polarization. The first waveguide may be on a first oxide layer.

At block 704, the method 700 may include converting, in a mode-conversion section of the first waveguide, electromagnetic waves having the second polarization into electromagnetic waves having the first polarization with a second mode-order.

At block 706, the method 700 may include coupling electromagnetic waves having the first polarization with the second mode-order from a coupling section of the first waveguide into an adjacent coupling section of a second waveguide as electromagnetic waves having the first polarization with the first mode-order. The second waveguide may be on the first oxide layer. At least a portion of the first waveguide and at least a portion of the second waveguide may be encapsulated between the first oxide layer and a second oxide layer.

At block 708, the method 700 may include emitting, from a second end of the first waveguide and a second end of the second waveguide, electromagnetic waves having the first polarization with the first mode-order.

Figure 8:
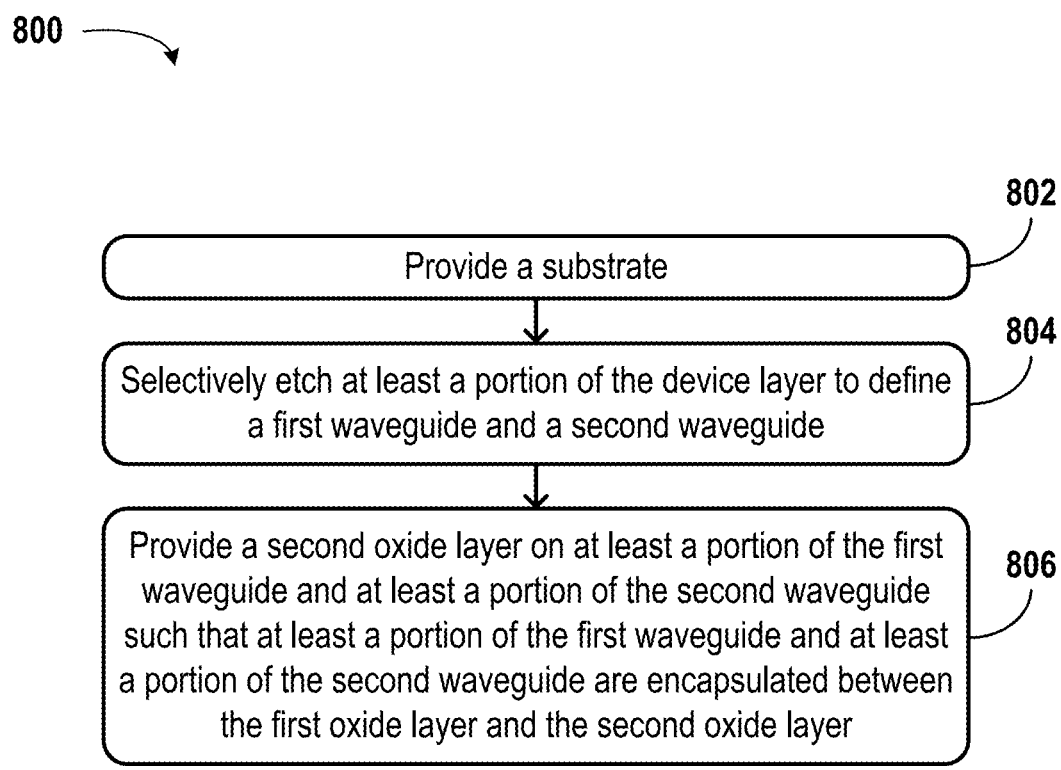
FIG. 8 is a flowchart illustrating a method, according to example embodiments.

FIG. 8 is a flowchart diagram of a method 800, according to example embodiments. The method 800 may be performed to fabricate a device (e.g., the device 100 shown and described with reference to FIG. 1A).

At block 802, the method 800 may include providing a substrate. The substrate may include a handle layer, a first oxide layer, and a device layer on the first oxide layer.

At block 804, the method 800 may include selectively etching at least a portion of the device layer to define a first waveguide and a second waveguide. The first waveguide may include a first end configured to receive electromagnetic waves having a first polarization with a first mode-order and electromagnetic waves having a second polarization. The first waveguide may also include a mode-conversion section configured to convert electromagnetic waves having the second polarization into electromagnetic waves having the first polarization with a second mode-order. In addition, the first waveguide may include a coupling section. Further, the first waveguide may include a second end configured to emit electromagnetic waves having the first polarization with the first mode-order. The second waveguide may include a first end. The second waveguide may also include a coupling section positioned adjacent to the coupling section of the first waveguide and configured such that electromagnetic waves having the first polarization with the second mode-order are converted into electromagnetic waves having the first polarization with the first mode-order and coupled from the coupling section of the first waveguide into the coupling section of the second waveguide. Further, the second waveguide may include a second end configured to emit electromagnetic waves having the first polarization with the first mode-order.

At block 806, the method 800 may include providing a second oxide layer on at least a portion of the first waveguide and at least a portion of the second waveguide such that at least a portion of the first waveguide and at least a portion of the second waveguide are encapsulated between the first oxide layer and the second oxide layer.

In some embodiments of the method 800, the substrate may include a silicon on insulator (SOI) substrate.

In some embodiments of the method 800, at least a portion of the first waveguide or the second waveguide may include a rib waveguide.

In some embodiments of the method 800, block 804 may include selectively etching a ridge and a pedestal in the device layer. Further, block 804 may include selectively etching, after selectively etching the ridge and the pedestal, the pedestal further such that a top of the pedestal is below a top of the ridge.

In some embodiments of the method 800, block 804 may include selectively etching a ridge in the device layer. Further, block 804 may include selectively etching, after selectively etching the ridge, a pedestal such that a top of the pedestal is below a top of the ridge.

In some embodiments of the method 800, block 804 may include selectively etching a pedestal in the device layer. Further, block 804 may include selectively etching, after selectively etching the pedestal, a ridge such that a top of the ridge is above a top of the pedestal.

In some embodiments of the method 800, providing the second oxide layer may include depositing the second oxide layer on the first waveguide and the second waveguide using chemical vapor deposition.

In some embodiments of the method 800, providing the second oxide layer may include growing the second oxide layer on the first waveguide and the second waveguide using thermal oxidation.

In some embodiments of the method 800, block 804 may include performing one or more photolithography steps to define a mask. Further, block 804 may include using the mask to perform selective etching.

In some embodiments of the method 800, block 804 may include performing a dry etch process.

In some embodiments of the method 800, block 804 may include performing a wet etch process.

IV. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

The computer-readable medium can also include non-transitory computer-readable media such as computer-readable media that store data for short periods of time like register memory and processor cache. The computer-readable media can further include non-transitory computer-readable media that store program code and/or data for longer periods of time. Thus, the computer-readable media may include secondary or persistent long term storage, like ROM, optical or magnetic disks, solid state drives, compact-disc read-only memory (CD-ROM), for example. The computer-readable media can also be any other volatile or non-volatile storage systems. A computer-readable medium can be considered a computer-readable storage medium, for example, or a tangible storage device.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

Embodiments of the present disclosure may thus relate to one of the enumerated example embodiments (EEEs) listed below.

EEE 1 is a device comprising:
a first oxide layer;
a first waveguide on the first oxide layer, wherein the first waveguide comprises:
  a first end configured to receive electromagnetic waves having a first polarization with a first mode-order and electromagnetic waves having a second polarization;
  a mode-conversion section configured to convert electromagnetic waves having the second polarization into electromagnetic waves having the first polarization with a second mode-order;
  a coupling section; and
  a second end configured to emit electromagnetic waves having the first polarization with the first mode-order;
a second waveguide on the first oxide layer, wherein the second waveguide comprises:
  a first end;
  a coupling section positioned adjacent to the coupling section of the first waveguide and configured such that electromagnetic waves having the first polarization with the second mode-order are converted into electromagnetic waves having the first polarization with the first mode-order and coupled from the coupling section of the first waveguide into the coupling section of the second waveguide; and
  a second end configured to emit electromagnetic waves having the first polarization with the first mode-order; and
a second oxide layer disposed so as to encapsulate at least a portion of the first waveguide and at least a portion of the second waveguide between the first oxide layer and the second oxide layer.

EEE 2 is the device of EEE 1, wherein at least a portion of the first waveguide or the second waveguide comprises a rib waveguide.

EEE 3 is the device of EEE 2, wherein the rib waveguide comprises:
a pedestal on the first oxide layer, wherein the pedestal has a thickness between 60 nm and 80 nm; and
a ridge on the pedestal, wherein the ridge has a thickness between 140 nm and 160 nm.

EEE 4 is the device of EEE 2, wherein the rib waveguide comprises:
a pedestal on the first oxide layer, wherein the pedestal has a thickness between 140 nm and 160 nm; and
a ridge on the pedestal, wherein the ridge has a thickness between 60 nm and 80 nm.

EEE 5 is the device of any of EEEs 1-4, wherein the mode-conversion section of the first waveguide comprises a tapered rib section.

EEE 6 is the device of EEE 5, wherein the tapered rib section has a length between 35 µm and 40 µm, and wherein the tapered rib section of the first waveguide comprises:
a tapered pedestal on the first oxide layer; and
a ridge on the tapered pedestal,
wherein the ridge has a width between 440 nm and 460 nm, and
wherein the tapered pedestal has a width that tapers from (i) the width of the ridge at a first end of the tapered rib section to (ii) between 4.5 µm and 5.5 µm at the second end of the tapered rib section.

EEE 7 is the device of any of EEEs 1-6, wherein the first waveguide comprises an adiabatic tapered rib section that connects the mode-conversion section of the first waveguide to the coupling section of the first waveguide.

EEE 8 is the device of EEE 7, wherein the adiabatic tapered rib section has a length between 15 µm and 20 µm, and wherein the adiabatic tapered rib section of the first waveguide comprises:
a pedestal on the first oxide layer, wherein the pedestal has a width between 4.5 µm and 5.5 µm; and
an adiabatic tapered ridge on the pedestal, wherein the adiabatic tapered ridge has a width that tapers from (i) between 440 nm and 460 nm at a first end of the adiabatic tapered rib section to (ii) between 900 nm and 920 nm at a second end of the adiabatic tapered rib section.

EEE 9 is the device of any of EEEs 1-8, wherein the first waveguide is configured to receive electromagnetic waves having wavelengths between 1530 nm and 1565 nm.

EEE 10 is the device of any of EEEs 1-4, wherein the mode-conversion section of the first waveguide comprises a tapered rib section, wherein the tapered rib section has a length between 35 µm and 40 µm, and wherein the tapered rib section comprises:
a tapered pedestal on the first oxide layer; and
an adiabatic tapered ridge on the tapered pedestal,
wherein the adiabatic tapered ridge has a width that tapers from (i) between 440 nm and 460 nm at a first end of the tapered rib section to (ii) between 900 nm and 920 nm at a second end of the tapered rib section, and
wherein the tapered pedestal has a width that tapers from (i) a minimum width of the adiabatic tapered ridge at the first end of the tapered rib section to (ii) between 4.5 µm and 5.5 µm at the second end of the tapered rib section.

EEE 11 is the device of any of EEEs 1-4 or 10, wherein the first waveguide is configured to receive electromagnetic waves having wavelengths between 1260 nm and 1360 nm.

EEE 12 is the device of any of EEEs 1-11, wherein at least a portion of the first waveguide or the second waveguide comprises a ridge waveguide.

EEE 13 is the device of EEE 12, wherein the ridge waveguide has a width of between 350 nm and 400 nm.

EEE 14 is the device of any of EEEs 1-13, wherein the first waveguide and the second waveguide each comprise Si or SiN.

EEE 15 is the device of any of EEEs 1-14, wherein the mode-conversion section of the first waveguide has a length between 35 µm and 40 µm, wherein the coupling section of the first waveguide and the coupling section of the second waveguide each have lengths between 20 µm and 25 µm, wherein the coupling section of the second waveguide has a width between 390 nm and 410 nm, and wherein the second end of the first waveguide and the second end of the second waveguide each have widths between 440 nm and 460 nm.

EEE 16 is the device of any of EEEs 1-15, wherein the first oxide layer or the second oxide layer has a thickness between 1.9 µm and 2.1 µm.

EEE 17 is the device of any of EEEs 1-16, wherein the first oxide layer or the second oxide layer comprises $SiO_2$.

EEE 18 is the device of any of EEEs 1-17, wherein the first end of the first waveguide is configured to receive electromagnetic waves from a coherent optical transceiver.

EEE 19 is the device of any of EEEs 1-18, wherein the second waveguide comprises an s-shaped section, and wherein a lateral spatial separation between the first waveguide and the second waveguide is greater at a second end of the s-shaped section than at a first end of the s-shaped section.

EEE 20 is the device of any of EEEs 1-19, wherein electromagnetic waves having the first polarization with the first mode-order are electromagnetic waves in a $TE_0$ mode, wherein electromagnetic waves having the first polarization with the second mode-order are electromagnetic waves in a $TE_1$ mode, and wherein electromagnetic waves having the second polarization are electromagnetic waves in a $TM_0$ mode.

EEE 21 is the device of any of EEEs 1-10 or 12-20, wherein a polarization crosstalk between the second end of the first waveguide and the second end of the second waveguide is less than −10 dB when the electromagnetic waves received at the first end of the first waveguide have wavelengths between 1500 nm and 1600 nm.

EEE 22 is the device of any of EEEs 1-10 or 12-21, wherein a converting loss arising from converting from electromagnetic waves having the second polarization into electromagnetic waves having the first polarization with the first mode-order is less than 0.5 dB when the electromagnetic waves received at the first end of the first waveguide have wavelengths between 1500 nm and 1600 nm.

EEE 23 is the device of any of EEEs 1-22, further comprising a handle layer, wherein the first oxide layer is on the handle layer.

EEE 24 is the device of EEE 23, wherein the handle layer comprises Si, and wherein the handle layer has a thickness between 710 µm and 740 µm.

EEE 25 is a method comprising:
receiving, at a first end of a first waveguide, electromagnetic waves having a first polarization with a first mode-order and electromagnetic waves having a second polarization, wherein the first waveguide is on a first oxide layer;
converting, in a mode-conversion section of the first waveguide, electromagnetic waves having the second polarization into electromagnetic waves having the first polarization with a second mode-order;
coupling electromagnetic waves having the first polarization with the second mode-order from a coupling section of the first waveguide into an adjacent coupling section of a second waveguide as electromagnetic waves having the first polarization with the first mode-order, wherein the second waveguide is on the first oxide layer, and wherein at least a portion of the first waveguide and at least a portion of the second waveguide are encapsulated between the first oxide layer and a second oxide layer; and
emitting, from a second end of the first waveguide and a second end of the second waveguide, electromagnetic waves having the first polarization with the first mode-order.

EEE 26 is a method of manufacture comprising:
providing a substrate, wherein the substrate comprises a handle layer, a first oxide layer, and a device layer on the first oxide layer;
selectively etching at least a portion of the device layer to define a first waveguide and a second waveguide,
wherein the first waveguide comprises:
a first end configured to receive electromagnetic waves having a first polarization with a first mode-order and electromagnetic waves having a second polarization;
a mode-conversion section configured to convert electromagnetic waves having the second polarization into electromagnetic waves having the first polarization with a second mode-order;
a coupling section; and
a second end configured to emit electromagnetic waves having the first polarization with the first mode-order, and
wherein the second waveguide comprises:
a first end;
a coupling section positioned adjacent to the coupling section of the first waveguide and configured such that electromagnetic waves having the first polarization with the second mode-order are converted into electromagnetic waves having the first polarization with the first mode-order and coupled from the coupling section of the first waveguide into the coupling section of the second waveguide; and
a second end configured to emit electromagnetic waves having the first polarization with the first mode-order; and
providing a second oxide layer on at least a portion of the first waveguide and at least a portion of the second waveguide such that at least a portion of the first waveguide and at least a portion of the second waveguide are encapsulated between the first oxide layer and the second oxide layer.

EEE 27 is the method of EEE 26, wherein the substrate comprises a silicon on insulator (SOI) substrate.

EEE 28 is the method of EEE 26 or EEE 27, wherein at least a portion of the first waveguide or the second waveguide comprises a rib waveguide.

EEE 29 is the method of EEE 28, wherein selectively etching at least a portion of the device layer comprises:
selectively etching a ridge and a pedestal in the device layer; and
selectively etching, after selectively etching the ridge and the pedestal, the pedestal further such that a top of the pedestal is below a top of the ridge.

EEE 30 is the method of EEE 28, wherein selectively etching at least a portion of the device layer comprises:
selectively etching a ridge in the device layer; and selectively etching, after selectively etching the ridge, a pedestal such that a top of the pedestal is below a top of the ridge.

EEE 31 is the method of EEE 28, wherein selectively etching at least a portion of the device layer comprises:
selectively etching a pedestal in the device layer; and
selectively etching, after selectively etching the pedestal, a ridge such that a top of the ridge is above a top of the pedestal.

EEE 32 is the method of any of EEEs 26-31, wherein providing the second oxide layer comprises depositing the second oxide layer on the first waveguide and the second waveguide using chemical vapor deposition.

EEE 33 is the method of any of EEEs 26-32, wherein providing the second oxide layer comprises growing the second oxide layer on the first waveguide and the second waveguide using thermal oxidation.

EEE 34 is the method of any of EEEs 26-33, wherein selectively etching at least a portion of the device layer comprises:
performing one or more photolithography steps to define a mask;
using the mask to perform selective etching.

EEE 35 is the method of any of EEEs 26-34, wherein selectively etching at least a portion of the device layer comprises performing a dry etch process.

EEE 36 is the method of any of EEEs 26-35, wherein selectively etching at least a portion of the device layer comprises performing a wet etch process.

EEE 37 is a device comprising:
a first oxide layer;
a first waveguide on the first oxide layer, wherein the first waveguide comprises:
a means-for receiving electromagnetic waves having a first polarization with a first mode-order and electromagnetic waves having a second polarization;
a means-for converting electromagnetic waves having the second polarization into electromagnetic waves having the first polarization with a second mode-order;
a means-for coupling; and
a means-for emitting electromagnetic waves having the first polarization with the first mode-order;
a second waveguide on the first oxide layer, wherein the second waveguide comprises:
a means-for coupling, wherein the means-for coupling of the second waveguide is (i) positioned adjacent to the means-for coupling of the first waveguide and (ii) configured such that electromagnetic waves having the first polarization with the second mode-order are converted into electromagnetic waves having the first polarization with the first mode-order and coupled from means-for coupling of the first waveguide into the means-for coupling section of the second waveguide; and
a means-for emitting electromagnetic waves having the first polarization with the first mode-order; and
a second oxide layer disposed so as to encapsulate at least a portion of the first waveguide and at least a portion of the second waveguide between the first oxide layer and the second oxide layer.

What is claimed:

1. A device comprising:
a first oxide layer;
a first waveguide on the first oxide layer, wherein the first waveguide comprises:
a first end configured to receive electromagnetic waves having a first polarization with a first mode-order and electromagnetic waves having a second polarization;
a mode-conversion section configured to convert electromagnetic waves having the second polarization into electromagnetic waves having the first polarization with a second mode-order;
a coupling section; and
a second end configured to emit electromagnetic waves having the first polarization with the first mode-order;
a second waveguide on the first oxide layer, wherein the second waveguide comprises:
a first end;
a coupling section positioned adjacent to the coupling section of the first waveguide and configured such that electromagnetic waves having the first polarization with the second mode-order are converted into electromagnetic waves having the first polarization with the first mode-order and coupled from the coupling section of the first waveguide into the coupling section of the second waveguide; and
a second end configured to emit electromagnetic waves having the first polarization with the first mode-order; and
a second oxide layer disposed so as to encapsulate at least a portion of the first waveguide and at least a portion of the second waveguide between the first oxide layer and the second oxide layer.

2. The device of claim 1, wherein at least a portion of the first waveguide or the second waveguide comprises a rib waveguide.

3. The device of claim 2, wherein the rib waveguide comprises:
a pedestal on the first oxide layer, wherein the pedestal has a thickness between 60 nm and 80 nm; and
a ridge on the pedestal, wherein the ridge has a thickness between 140 nm and 160 nm.

4. The device of claim 2, wherein the rib waveguide comprises:
a pedestal on the first oxide layer, wherein the pedestal has a thickness between 140 nm and 160 nm; and
a ridge on the pedestal, wherein the ridge has a thickness between 60 nm and 80 nm.

5. The device of claim 1, wherein the mode-conversion section of the first waveguide comprises a tapered rib section.

6. The device of claim 5, wherein the tapered rib section has a length between 35 µm and 40 µm, and wherein the tapered rib section of the first waveguide comprises:
a tapered pedestal on the first oxide layer; and
a ridge on the tapered pedestal,
wherein the ridge has a width between 440 nm and 460 nm, and
wherein the tapered pedestal has a width that tapers from (i) the width of the ridge at a first end of the tapered rib section to (ii) between 4.5 µm and 5.5 µm at the second end of the tapered rib section.

7. The device of claim 1, wherein the first waveguide comprises an adiabatic tapered rib section that connects the mode-conversion section of the first waveguide to the coupling section of the first waveguide.

8. The device of claim 7, wherein the adiabatic tapered rib section has a length between 15 µm and 20 µm, and wherein the adiabatic tapered rib section of the first waveguide comprises:

a pedestal on the first oxide layer, wherein the pedestal has a width between 4.5 µm and 5.5 µm; and an adiabatic tapered ridge on the pedestal, wherein the adiabatic tapered ridge has a width that tapers from (i) between 440 nm and 460 nm at a first end of the adiabatic tapered rib section to (ii) between 900 nm and 920 nm at a second end of the adiabatic tapered rib section.

9. The device of claim 1, wherein the mode-conversion section of the first waveguide comprises a tapered rib section, wherein the tapered rib section has a length between 35 µm and 40 µm, and wherein the tapered rib section comprises:

a tapered pedestal on the first oxide layer; and
an adiabatic tapered ridge on the tapered pedestal,
wherein the adiabatic tapered ridge has a width that tapers from (i) between 440 nm and 460 nm at a first end of the tapered rib section to (ii) between 900 nm and 920 nm at a second end of the tapered rib section, and
wherein the tapered pedestal has a width that tapers from (i) a minimum width of the adiabatic tapered ridge at the first end of the tapered rib section to (ii) between 4.5 µm and 5.5 µm at the second end of the tapered rib section.

10. The device of claim 1, wherein the mode-conversion section of the first waveguide has a length between 35 µm and 40 µm, wherein the coupling section of the first waveguide and the coupling section of the second waveguide each have lengths between 20 µm and 25 µm, wherein the coupling section of the second waveguide has a width between 390 nm and 410 nm, and wherein the second end of the first waveguide and the second end of the second waveguide each have widths between 440 nm and 460 nm.

11. The device of claim 1, wherein the second waveguide comprises an s-shaped section, and wherein a lateral spatial separation between the first waveguide and the second waveguide is greater at a second end of the s-shaped section than at a first end of the s-shaped section.

12. The device of claim 1, wherein a polarization crosstalk between the second end of the first waveguide and the second end of the second waveguide is less than −10 dB when the electromagnetic waves received at the first end of the first waveguide have wavelengths between 1500 nm and 1600 nm.

13. The device of claim 1, wherein a converting loss arising from converting from electromagnetic waves having the second polarization into electromagnetic waves having the first polarization with the first mode-order is less than 0.5 dB when the electromagnetic waves received at the first end of the first waveguide have wavelengths between 1500 nm and 1600 nm.

14. A method comprising:
receiving, at a first end of a first waveguide, electromagnetic waves having a first polarization with a first mode-order and electromagnetic waves having a second polarization, wherein the first waveguide is on a first oxide layer;
converting, in a mode-conversion section of the first waveguide, electromagnetic waves having the second polarization into electromagnetic waves having the first polarization with a second mode-order;
coupling electromagnetic waves having the first polarization with the second mode-order from a coupling section of the first waveguide into an adjacent coupling section of a second waveguide as electromagnetic waves having the first polarization with the first mode-order, wherein the second waveguide is on the first oxide layer, and wherein at least a portion of the first waveguide and at least a portion of the second waveguide are encapsulated between the first oxide layer and a second oxide layer; and
emitting, from a second end of the first waveguide and a second end of the second waveguide, electromagnetic waves having the first polarization with the first mode-order.

15. A method of manufacture comprising:
providing a substrate, wherein the substrate comprises a handle layer, a first oxide layer, and a device layer on the first oxide layer;
selectively etching at least a portion of the device layer to define a first waveguide and a second waveguide,
wherein the first waveguide comprises:
a first end configured to receive electromagnetic waves having a first polarization with a first mode-order and electromagnetic waves having a second polarization;
a mode-conversion section configured to convert electromagnetic waves having the second polarization into electromagnetic waves having the first polarization with a second mode-order;
a coupling section; and
a second end configured to emit electromagnetic waves having the first polarization with the first mode-order, and
wherein the second waveguide comprises:
a first end;
a coupling section positioned adjacent to the coupling section of the first waveguide and configured such that electromagnetic waves having the first polarization with the second mode-order are converted into electromagnetic waves having the first polarization with the first mode-order and coupled from the coupling section of the first waveguide into the coupling section of the second waveguide; and
a second end configured to emit electromagnetic waves having the first polarization with the first mode-order; and
providing a second oxide layer on at least a portion of the first waveguide and at least a portion of the second waveguide such that at least a portion of the first waveguide and at least a portion of the second waveguide are encapsulated between the first oxide layer and the second oxide layer.

16. The method of claim 15, wherein at least a portion of the first waveguide or the second waveguide comprises a rib waveguide.

17. The method of claim 16, wherein selectively etching at least a portion of the device layer comprises:
selectively etching a ridge and a pedestal in the device layer; and
selectively etching, after selectively etching the ridge and the pedestal, the pedestal further such that a top of the pedestal is below a top of the ridge.

18. The method of claim 16, wherein selectively etching at least a portion of the device layer comprises:
selectively etching a ridge in the device layer; and
selectively etching, after selectively etching the ridge, a pedestal such that a top of the pedestal is below a top of the ridge.

19. The method of claim 15, wherein providing the second oxide layer comprises depositing the second oxide layer on the first waveguide and the second waveguide using chemical vapor deposition.

20. The method of claim 15, wherein providing the second oxide layer comprises growing the second oxide layer on the first waveguide and the second waveguide using thermal oxidation.

\* \* \* \* \*